US010514710B2

(12) United States Patent
Pohl et al.

(10) Patent No.: US 10,514,710 B2
(45) Date of Patent: Dec. 24, 2019

(54) UNMANNED AERIAL VEHICLE ALIGNMENT SYSTEM

(71) Applicant: Intel IP Corporation, Santa Clara, CA (US)

(72) Inventors: Daniel Pohl, Puchheim (DE); Daniel Gurdan, Germering (DE); Roman Schick, Krailing (DE); Tim Ranft, Fuerstenfeldbruck (DE)

(73) Assignee: Intel IP Corporation, Santa Clara, CA (US)

( * ) Notice: Subject to any disclaimer, the term of this patent is extended or adjusted under 35 U.S.C. 154(b) by 136 days.

(21) Appl. No.: 15/716,628

(22) Filed: Sep. 27, 2017

(65) Prior Publication Data
US 2019/0094889 A1 Mar. 28, 2019

(51) Int. Cl.
G05D 1/12 (2006.01)
B64C 39/02 (2006.01)
B64D 47/08 (2006.01)
B64D 47/02 (2006.01)
G09F 21/06 (2006.01)
G05D 1/10 (2006.01)
G08G 5/00 (2006.01)

(52) U.S. Cl.
CPC ............ G05D 1/12 (2013.01); B64C 39/024 (2013.01); B64D 47/02 (2013.01); B64D 47/08 (2013.01); G05D 1/104 (2013.01); G08G 5/00 (2013.01); G09F 21/06 (2013.01); B64C 2201/027 (2013.01); B64C 2201/042 (2013.01); B64C 2201/108 (2013.01); B64C 2201/12 (2013.01)

(58) Field of Classification Search
None
See application file for complete search history.

(56) References Cited

U.S. PATENT DOCUMENTS

| 7,894,948 | B2 * | 2/2011 | Stroud ............... G01S 5/0027 701/11 |
| 9,104,201 | B1 * | 8/2015 | Pillai ................... B64C 39/024 |
| 9,809,306 | B2 * | 11/2017 | Stark ................... B64C 39/024 |
| 2005/0230563 | A1 | 10/2005 | Corcoran, III |

(Continued)

FOREIGN PATENT DOCUMENTS

WO 2016065343 A1 4/2016

OTHER PUBLICATIONS

Bristeau et al., "The Navigation and Control technology inside the AR.Drone micro UAV", Aug. 28-Sep. 2, 2011, IFAC 18th World Congress, p. 2-3 (On-board electronics) (Year: 2011).*

(Continued)

Primary Examiner — Tamara L Weber
(74) Attorney, Agent, or Firm — Viering,Jentschura&Partner mbB

(57) ABSTRACT

Herein is disclosed an unmanned aerial vehicle alignment system comprising one or more image sensors, configured to obtain an image of a plurality of unmanned aerial vehicles and provide to one or more processors image data corresponding to the obtained image; one or more processors, configured to detect from the image data image positions of the plurality of unmanned aerial vehicles; derive a target position based on a relationship between an image position and a target alignment; and determine an adjustment instruction to direct an unmanned aerial vehicle toward the target position.

18 Claims, 12 Drawing Sheets

(56) References Cited

U.S. PATENT DOCUMENTS

| | | | |
|---|---|---|---|
| 2006/0167596 A1 | 7/2006 | Bodin et al. | |
| 2014/0236388 A1* | 8/2014 | Wong | B64C 39/024 |
| | | | 701/2 |
| 2016/0293018 A1* | 10/2016 | Kim | G08G 5/0082 |
| 2017/0050747 A1* | 2/2017 | Wessler | B64D 45/08 |
| 2017/0137125 A1 | 5/2017 | Kales | |
| 2017/0221394 A1 | 8/2017 | Garcia Morchon et al. | |
| 2017/0320569 A1* | 11/2017 | Gordon | B64C 39/024 |
| 2018/0118337 A1* | 5/2018 | Viel | B64C 39/024 |
| 2018/0312274 A1* | 11/2018 | Kessler | B64D 47/06 |

OTHER PUBLICATIONS

Horsman, "Unmanned aerial vehicles: A preliminary analysis of forensic challenges", Dec. 9, 2015, Digital Investigation, vol. 16, p. 9 (A forensic perspective) (Year: 2015).*

International search report received for international Application No. PCT/US2018/044457 dated Nov. 12, 2018, 13 pages. (Reference purpose only).

Hausamann "UAV Sound Source Localization", Institute of Automatic Control Engineering, 2014, Computational Neuro Engineering Project Laboratory Final Report.

Pacholski "Extending the sensor edge smart drone positioning system", Nov. 2013, The University of Adelaide Faculty of Engineering, Computer and Mathematical Sciences.

Mandal et al., "Beep: 3D Indoor Positioning Using Audible Sound", Jan. 2005, Consumer Communications and Networking Conference, 2005, IEEE.

\* cited by examiner

UNMANNED AERIAL VEHICLE ALIGNMENT SYSTEM

TECHNICAL FIELD

Various embodiments relate generally to the positional management of unmanned aerial vehicles ("UAV").

BACKGROUND

UAVs may be equipped with one or more lights for displaying aerial images during a light show. Groups of UAVs may be programmed to reach aerial coordinates to render displays of one or more images. The UAVs may be equipped with a positioning system technology, such as the Global Positioning System ("GPS"), to navigate between preprogrammed positions. Accuracy limitations in GPS may result in a UAV failing to precisely reach a programmed location. Imprecise locations of one or more UAVs may disrupt a light show or detract from a light show's visual appeal.

SUMMARY

Herein is disclosed an unmanned aerial vehicle alignment system including one or more image sensors, configured to obtain an image of a plurality of unmanned aerial vehicles and provide to one or more processors image data corresponding to the obtained image; one or more processors, configured to detect from the image data image positions of the plurality of unmanned aerial vehicles; to derive a target position based on a relationship between an image position and a target alignment; and to determine an adjustment instruction to direct an unmanned aerial vehicle toward the target position.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
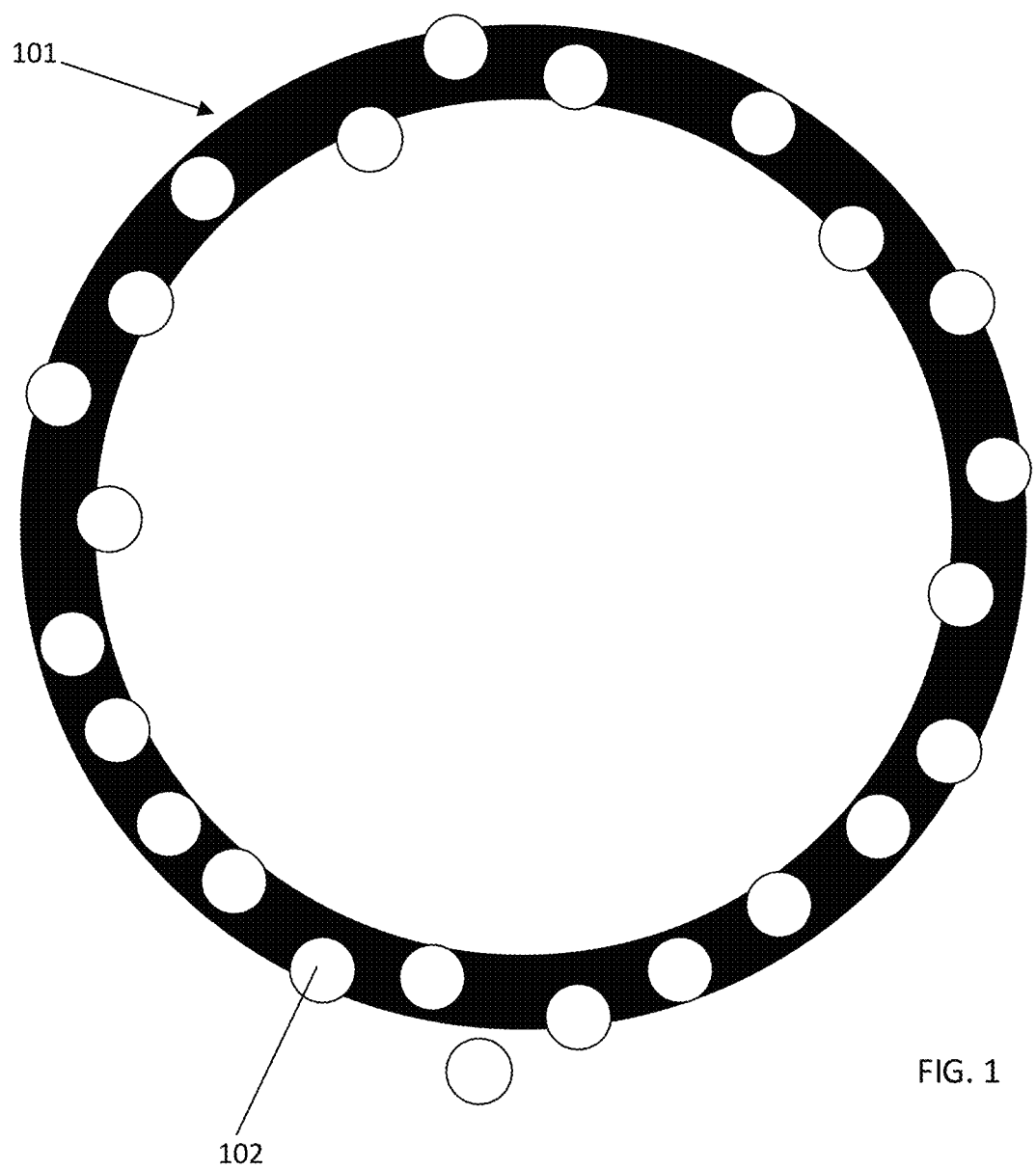
FIG. 1 shows a plurality of UAVs arranged within a programmed light show shape.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any embodiment or design described herein as "exemplary" is not necessarily to be construed as preferred or advantageous over other embodiments or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "position" used with regard to a "position of an unmanned aerial vehicle", "position of an object", "position of an obstacle", and the like, may be used herein to mean a point or region in a two- or three-dimensional space. It is understood that suitable coordinate systems with respective reference points are used to describe positions, vectors, movements, and the like.

The term "map" used with regard to a two- or three-dimensional map may include any suitable way of describing positions of objects in the two- or three-dimensional space.

According to various aspects, a voxel map may be used to describe objects in the three dimensional space based on voxels associated with objects. To prevent collision based on a voxel map, ray-tracing, ray-casting, rasterization, etc., may be applied to the voxel data.

An unmanned aerial vehicle (UAV) is an aircraft that has the capability of autonomous flight. In autonomous flight, a human pilot is not aboard and in control of the unmanned aerial vehicle. The unmanned aerial vehicle may also be denoted as unstaffed, uninhabited or unpiloted aerial vehicle, -aircraft or -aircraft system or drone.

The unmanned aerial vehicle, according to various aspects, may include a support frame that serves as basis for mounting components of the unmanned aerial vehicle, as for example, motors, sensors, mechanic, transmitter, receiver, and any type of control to control the functions of the unmanned aerial vehicle as desired.

The unmanned aerial vehicle, according to various aspects, may include a camera gimbal having an independent two- or three-axes degree of freedom to properly track a target, e.g. a person or point of interest, with a tracking camera independently of an actual flight direction or actual attitude of the unmanned aerial vehicle. In some aspects, a depth camera may be used for tracking, monitoring the vicinity, providing images to a user of the drone, etc. A depth camera may allow associating depth information with an image, e.g., to provide a depth image. This allows, for example, providing an image of the vicinity of the unmanned aerial vehicle including depth information about one or more objects depicted in the image. As an example, a depth image may include information to indicate a relative distance of objects displayed in the image. This distance information may be, but is not limited to, colors and/or shading to depict a relative distance from a sensor. Based on depth images, a three dimensional map may be constructed from the depth information. Said map construction may be achieved using a depth map engine, which may include one or more processors or a non-transitory computer readable medium configured to create a depth map from the depth information provided by the depth images.

The unmanned aerial vehicle described herein can be in the shape of an airplane (e.g. a fixed wing airplane) or a copter (e.g. multi rotor copter), i.e. a rotorcraft unmanned aerial vehicle, e.g. a quad-rotor unmanned aerial vehicle, a hex-rotor unmanned aerial vehicle, an octo-rotor unmanned aerial vehicle. The unmanned aerial vehicle described herein may include a plurality of rotors (e.g., three, four, five, six, seven, eight, or more than eight rotors), also referred to as propellers. Each propeller has at least one propeller blade and may include a plurality of blades. The propellers may be fixed pitch propellers.

FIG. 1 shows a sample ideal shape for a light show 101 and a plurality of UAVs 102 arranged generally within the ideal shape 101. Because of limitations in positioning systems, the plurality of UAVs 102 are arranged in approximate conformity to the ideal shape 101 but are unlikely to be precisely aligned with the ideal shape 101. Where the black band of 101 indicates an acceptable position of a UAV to establish the desired shape, various UAVs appear to be only partially within the black band, and at least one UAV is completely outside of the black band. Moreover, the UAVs are not equally spaced within the black band. Irregularities in spacing, as well as positioning outside of the desired range 101 result in distortion of the desired shape during the light show.

Figure 2:
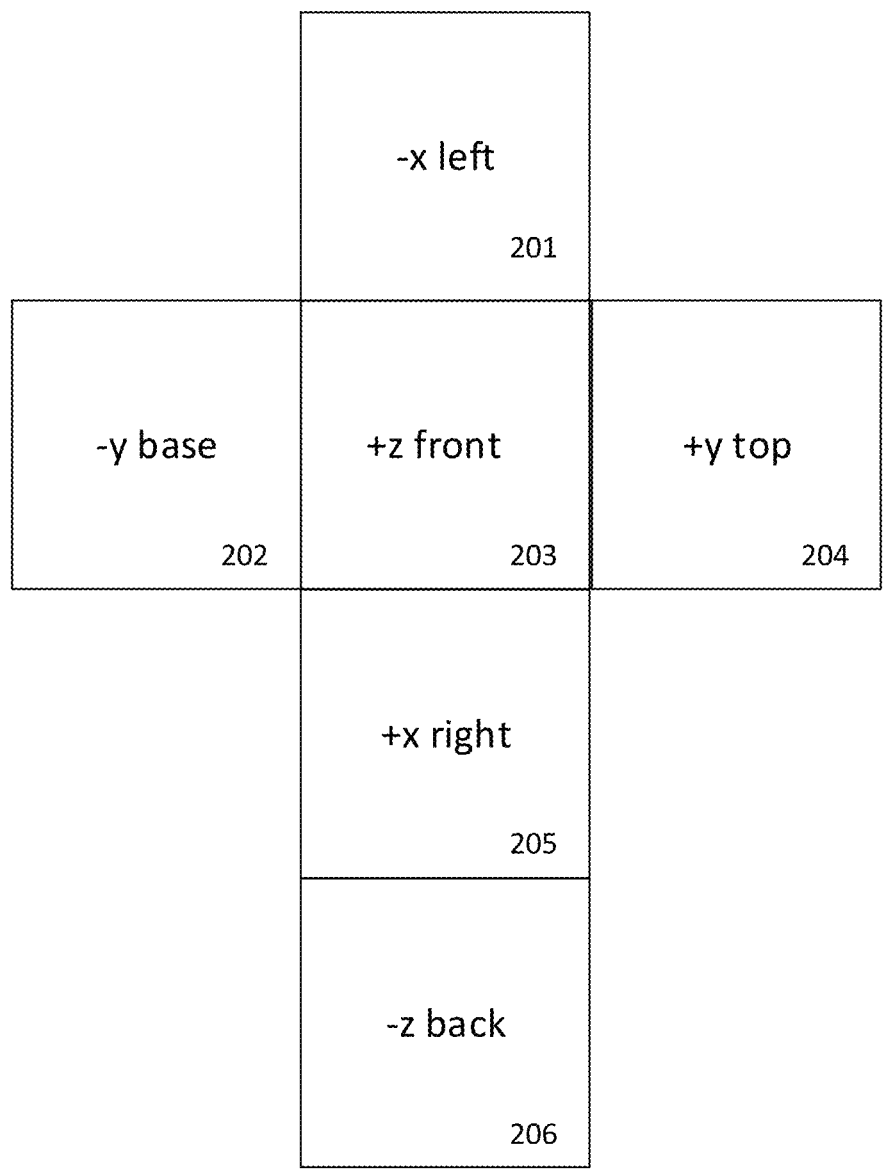
FIG. 2 shows a cube map structure.

It is possible to correct or refine a positioning system location with instructions derived from images of the light show. FIG. 2 shows a method of rendering a 360° photograph as a cube map. The cube map consists of six sections 201-206, wherein each number corresponds to a surface or face of a cube. A UAV may be equipped with one or more cameras capable of rendering, whether individually or in combination with one another, 360° of image data for an area surrounding the UAV. Data from each of the six primary directions (fore, aft, starboard, port, up, and down) may be stored as part of a cube map as depicted in FIG. 2. As depicted, and in accordance with a conventional cube map, images from a UAV may be stored as follows: starboard or left 201, down or base 202, fore or front 203, up or top 204, port or right 205, and aft or back 206. It is expressly noted that a cube map is one of many methods of rendering a 360° image, and nothing in this disclosure should be understood to be limited to rendering via a cube map. Other 360° rendering methods include, but are not limited to, spherical rendering, equirectangular projection. Any method of 360° rendering may be utilized for the disclosure.

Figure 3:
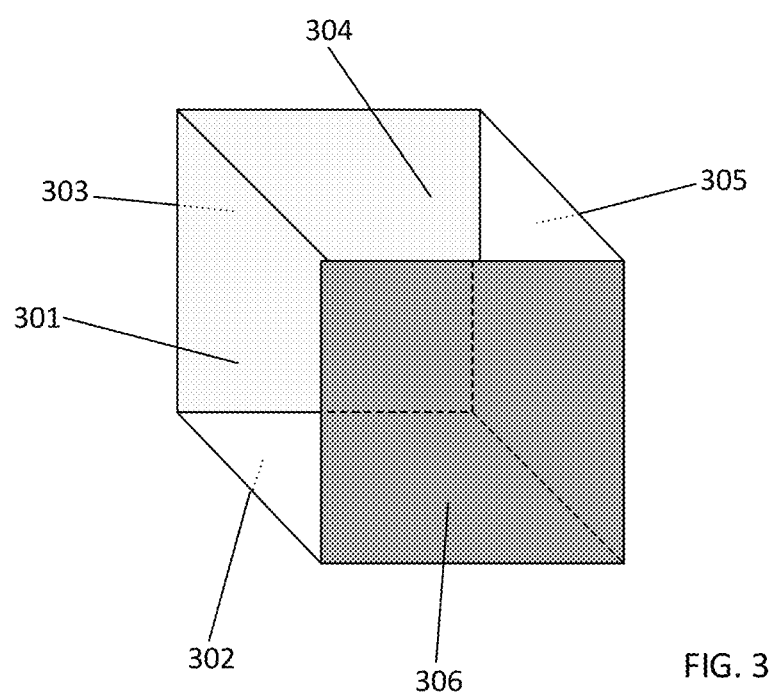
FIG. 3 shows the cube map image as assembled in cube format.

FIG. 3 shows the cube map image as assembled in cube format. Assuming a UAV with a camera mounted in each of the six principal directions, data imagery from each of the cameras may be stored as follows. 301 contains data from the starboard or left camera; 302 contains data from the bottom or down camera; 303 contains data from the fore or front camera; 304 contains data from the top or up camera; 305 contains data from the port or right camera; and 306 contains data from the aft or back camera.

Figure 4:
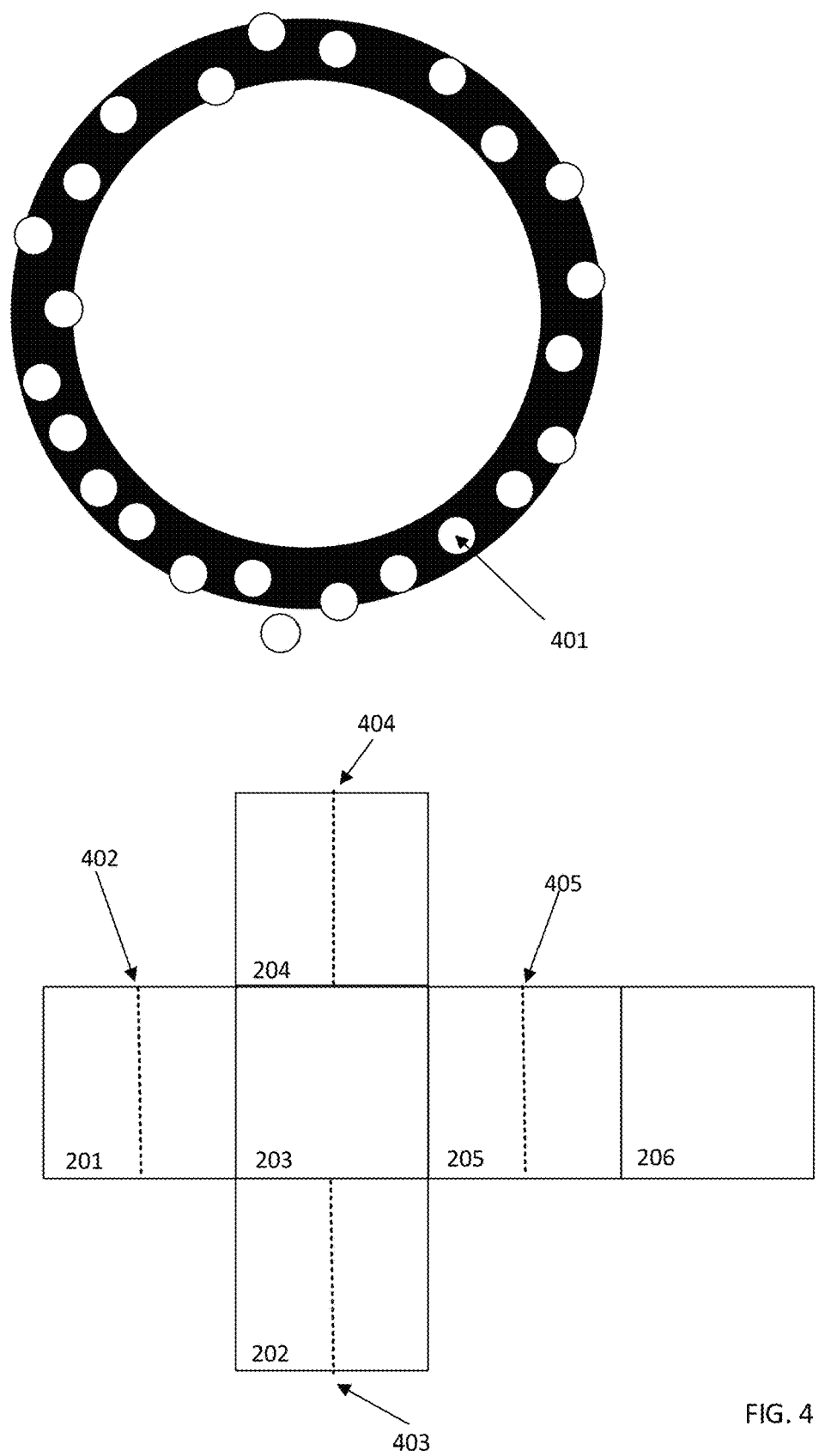
FIG. 4 shows image data from a scout UAV.

FIG. 4 shows image data from a scout UAV 401. According to one aspect of the disclosure, at least one of the plurality of UAVs may be selected as a scout UAV 401. At the top of FIG. 4, the scout UAV 401 is depicted as one of a plurality of UAVs generally within a light show form according to a programmed location. The scout may be a UAV regardless of position with respect to the light show. The scout UAV 401 may take images of the surrounding UAVs using one or more UAV-mounted image sensors. Where the scout UAV 401 receives six directions of image sensor images, the image sensor images may be stored in a cube map in the manner described above. FIG. 4 depicts a cube map as taken by a scout UAV 401. The dotted lines in blocks 201, 202, 204, and 205, as represented by 402, 403, 404, and 405, respectively, represent a plurality of UAVs in the format shown at the top of FIG. 4. This circular figure is a simplified figure, wherein the UAVs are ideally arranged within a single plane. Where the circular image in FIG. 4 is rotated along its x-axis by 90°, it would appear constructively as a straight line, assuming ideal planar alignment of the various UAVs creating the circular figure. For convenience, this prospective, wherein a UAV within a constructively planar shape views other UAVs within that shape, will be referred to as a "planar view." This planar view is depicted as a straight or dotted line within the boxes of the cube map in FIG. 4.

Figure 5:
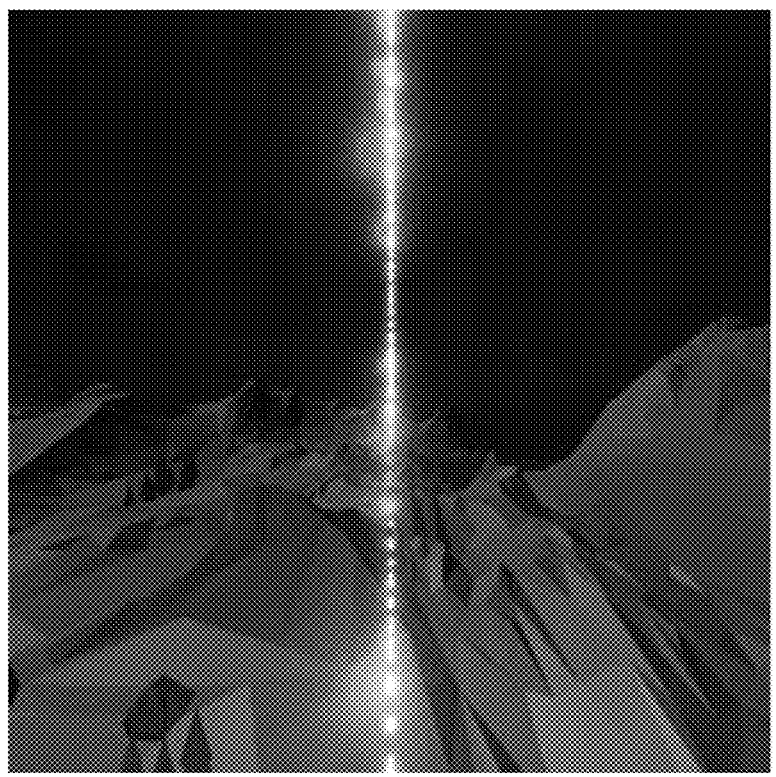
FIG. 5 shows a comparison of an ideal planar view with an actual planar view.
Figure 5:
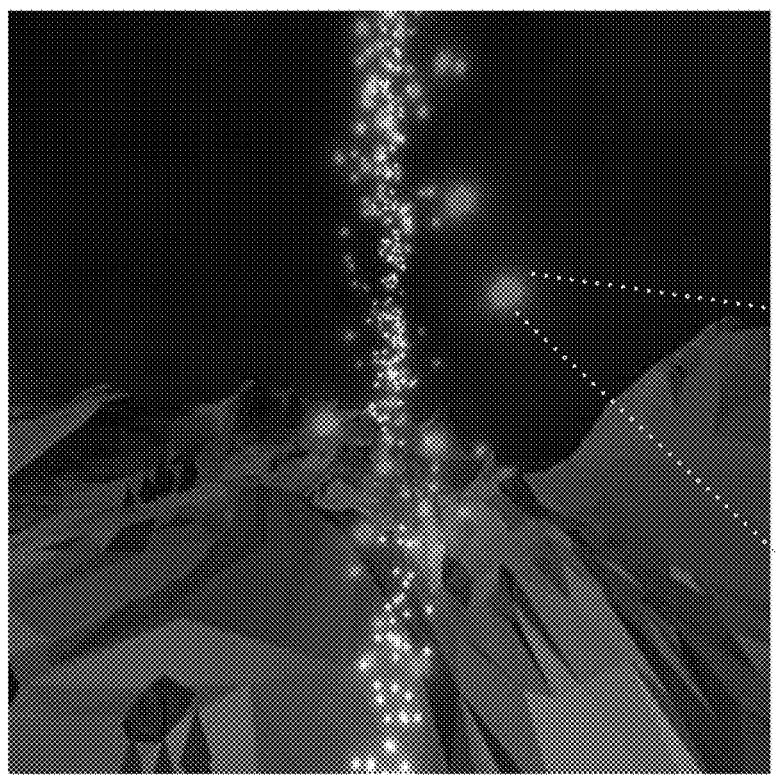
Figure 5:
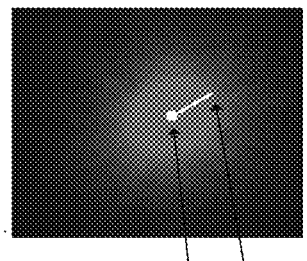

FIG. 5 shows a comparison of an ideal planar view 501 with an actual planar view 502. In the ideal planar view 501, the plurality of UAVs are arranged within a single plane and therefore appear primarily as a straight line. Where lights from individual UAVs are discernible, the lights are perceived in varying sizes, corresponding to a distance from the scout UAV 401. For example, individual UAVs located generally within the middle of 501 are shown as comparatively small dots, and would generally be farthest away from the scout UAV 401. Conversely, discernible lights at the bottom or top of 501 are considerably larger than the centrally-located lights in 501 and correspond with UAVs within the closest proximity to the scout UAV 401. An actual planar view of the light show is shown in 502. In this case, the UAVs do not appear as a single line, but rather as scattered light sources generally within a vertical area of the camera image. In this planar view, UAVs to the left or right of the centerline indicate UAVs that are in physically located outside of the ideal plane for the light show. Larger light sources generally indicate UAVs that are closer to the scout UAV 401, and smaller light sources generally indicate UAVs that are farther from the scout UAV 401. Using image data from the scout UAV 401, the center 503 and radius 504 of each UAV light can be calculated. Because the radius 504 corresponds with a distance of the light, and because the center 503 of the UAV light provides information about a horizontal or vertical relationship of the light to the scout UAV 401, the combined information from the center 503 and radius 504 provide information about the UAV's location in a three-dimensional space. This action can be performed for the individual UAVs shown in the image data. Using a sorting algorithm, the obtained distance and location information for the UAVs can be compared to one another and to programmed locations for the light show figure to estimate the identity of the UAVs outside of the desired plane. Where the UAVs are identified, instructions may be provided to the misaligned UAVs, such that the misaligned UAVs can return to the ideal plane, and the desired light show form may be improved.

Figure 6:
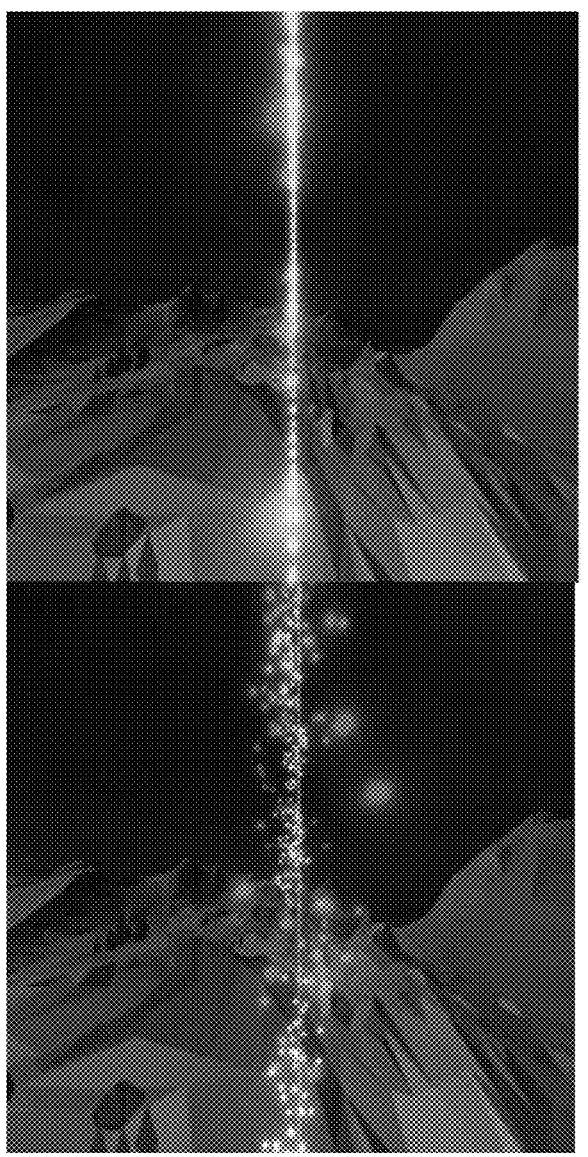
FIG. 6 shows the calculation of an average 1D position.

FIG. 6 shows the calculation of an average 1D position of UAEs within the image data. In this case, 601 shows an ideal UAE configuration as viewed from an ideal planar view. 602 shows image data in an actual UAV configuration showing various UAVs that are located outside of the desired plane. In this case, a target alignment may be a planer alignment, whereby one or more misaligned UAVs are given alignment instructions that cause them to travel toward a location that would result in reestablishment of a planar alignment. Where only two-dimensional information is obtained from the one or more image sensors, the planar alignment may functionally be a linear alignment. In calculating alignment instructions, it may be useful to determine an average 1D position of the UAVs within the image data. In this case, a 1D average is calculated for the ideal configuration 601 and the actual configuration 602. The 1D average is calculated by identifying a center of each UAV light, determining a coordinate of the center of each UAV light along the x-axis, or any axis perpendicular to the axis along which the UAV will be corrected, and averaging these points to determine an average point along the x-axis. This average point is then constructed as a line. In a planar light show installation, this line constructed from the 1D average may ideally correspond with the locations of the UAVs as seen from the planar view. As in 602, where multiple UAVs are located outside of the average 1D line, and where the misaligned UAVs can be identified, alignment instructions may be determined to cause the identified, misaligned UAVs to return to a plane that closely corresponds with the 1D average. The desired position using this plane may be referred to as a target position.

Figure 7:
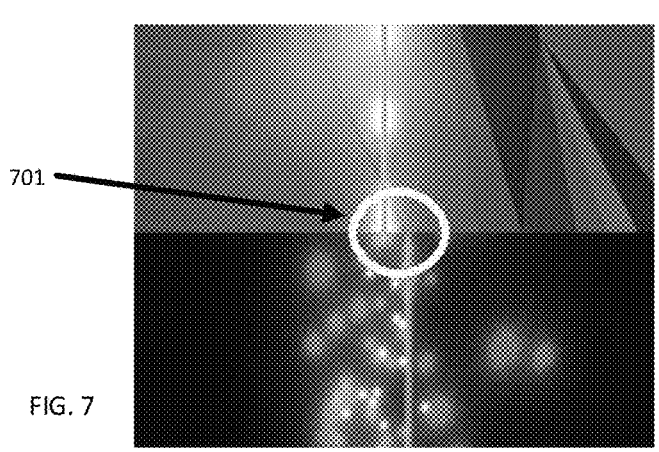
FIG. 7 shows a comparison of 1D alignment.

FIG. 7 shows a calculation of an average 1D position of a plurality of UAVs. The bottom portion of FIG. 7 shows an actual planar view of a plurality of UAVs experiencing position drift. The calculation of a 1D average provides a baseline that can be used to steer UAVs experiencing drift into alignment within a single plane. According to one aspect of the disclosure, the 1D average of the actual planar view can be compared with a 1D average of the ideal planar view, and the lines corresponding to the two 1D averages can be compared 701. Such a comparison may provide useful guidance information for error correction in other planes or dimensions. Regardless of whether a comparison to the ideal is performed, identified UAVs may be given alignment instructions to move in the direction of the actual 1D average. Where the UAVs experiencing drift converge toward the 1D average line, restoration of the intended plane is provided.

Figure 8:
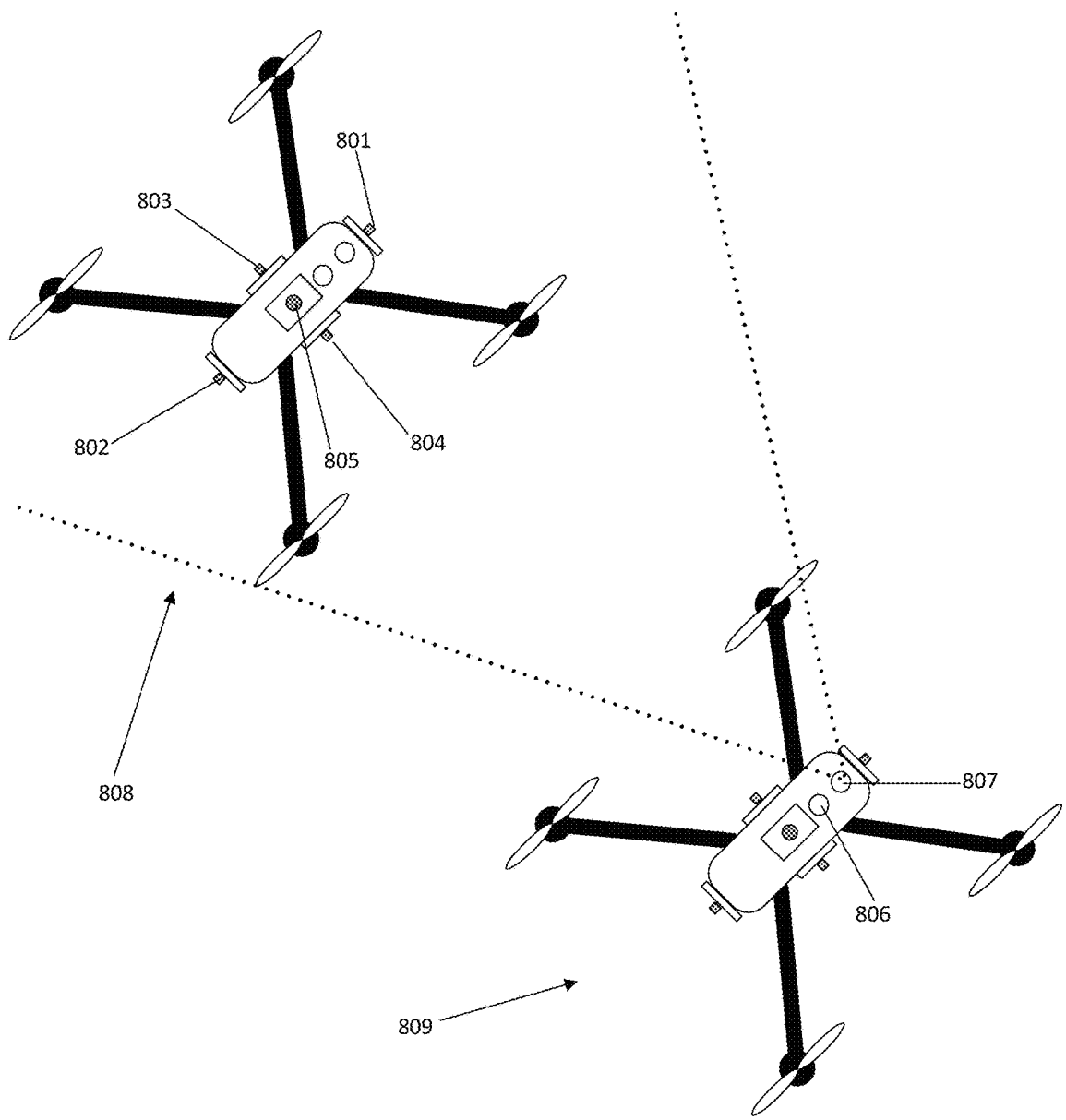
FIG. 8 shows a configuration of cameras and lights on a UAV.

FIG. 8 shows a configuration of cameras and lights according to one aspect of the disclosure. One or more UAVs may be equipped with image sensors or cameras, which may be used to obtain information about the location or identities of other UAVs. For obtaining 360° of image data, the UAV may be equipped with image sensors or cameras on the fore, aft, starboard, port, top, and bottom regions of the UAV, as shown by 801, 802, 803, 804, and 805, respectively (the bottom image sensor is not shown). In addition, the UAVs may be equipped with one or more lights 806 for use as a light display in a light show. The one or more lights 806 may be capable of transmitting light within a visible spectrum for use in a light show context. The one or more lights 806 may further be capable of producing light at a variety of colors and intensities, and may be capable of sustained light emission, blinking, strobing, and dimming. The UAVs may further be equipped with one or more additional lights 807, which may be configured to transmit light within a visible or non-visible spectrum. According to one aspect of the disclosure, the nonvisible spectrum of the one or more additional lights 807 may be infrared. The one or more additional lights 807 may assist a scout UAV 401 in determining the identification of a UAV within a light show. The one or more additional lights 807 may be configured to transmit at a wavelength, intensity, or pattern unique to the UAV, which may permit identification of the UAV to a scout UAV 401. Specifically, the one or more additional lights 807 may flash and a pattern unique to the UAV, or may transmit with a light wavelength or color (within the visible or invisible spectrum) which renders the UAV identifiable and distinguishable from one or more, or even each of the remaining UAVs. Identifying a specific UAV improves an ability to direct the one or more UAVs toward an average 1D plane or to the ideal plane. As displayed in FIG. 8, UAV 808 has been designated as a scout UAV 401 and is attempting to identify UAV 809, which is one of a plurality of UAVs within a light show. UAV 809 is equipped with an additional light 807, which allows UAV 809 to transmit an identifying light signal to UAV 808, which receives the identifying a light signal in its one or more image sensors or cameras 801-805 and processes same to identify UAV 809. According to one aspect of the disclosure, UAV 808 may calculate a 1D average of the UAVs, identify one or more UAVs based on image data, and calculate alignment instructions for one or more UAVs to converge toward a target location according to a target alignment. UAV 808 may transmit the converging instructions directly to one or more UAVs, or UAV 808 may transmit the converging instructions to a central UAV or a central base station, which may then forward the instructions to one or more UAVs. According to another aspect of the disclosure, UAV 808 may transmit raw camera image data and/or raw UAV identification data to a central UAV or a central base station, which then may perform an alignment algorithm or identification, determine converging instructions, and transmit same.

Figure 9:
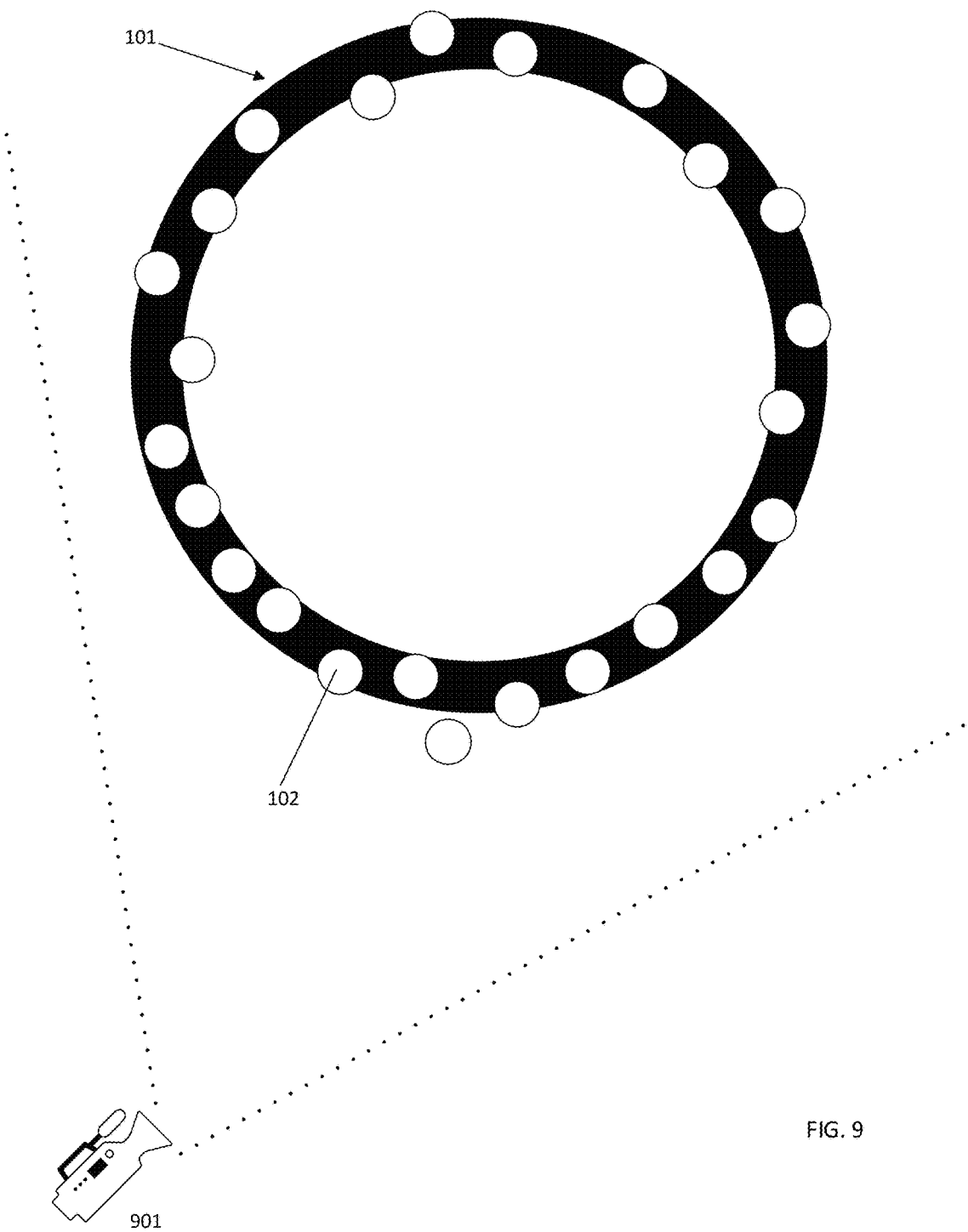
FIG. 9 shows a UAV alignment system using one or more image sensors external to a light show.

FIG. 9 shows a UAV alignment system using one or more exterior image sensors, according to another aspect of the disclosure. An ideal shape for a light show 101 and a plurality of UAVs 102 arranged generally within the ideal shape 101 are depicted. In addition, an external image sensor or camera 901 is depicted at a location removed from the light show. This may be any location within a line of sight of one or more UAVs within the light show including, but not limited to a position on the ground in the vicinity of the light show, or a position in the air exterior to the light show. The external image sensor or camera 901 may be equipped with a positioning system able to provide a position of the external image sensor or camera 901, which can be used to determine fixed camera parameters such as a field-of-view, focal length, or distance between the external image sensor or camera 901 and an ideal placement of a UAV. The external image sensor or camera 901 may be pre-programmed with a position of the external image sensor or camera. The image data received by the external image sensor or camera 901 may be analyzed to determine positions of one or more UAVs within a light show, as well as respective positioning between the UAVs. This data may be compared to a data set of programmed positions of the UAVs to determine a discrepancy between programmed position and actual position, or to identify one or more UAVs.

Figure 10:
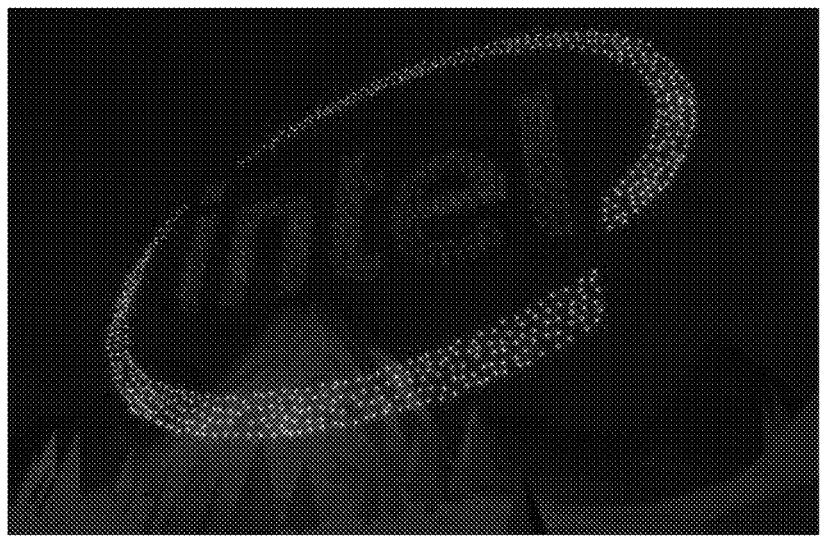
FIG. 10 shows an external image of a light show from a first vantage.
Figure 11:
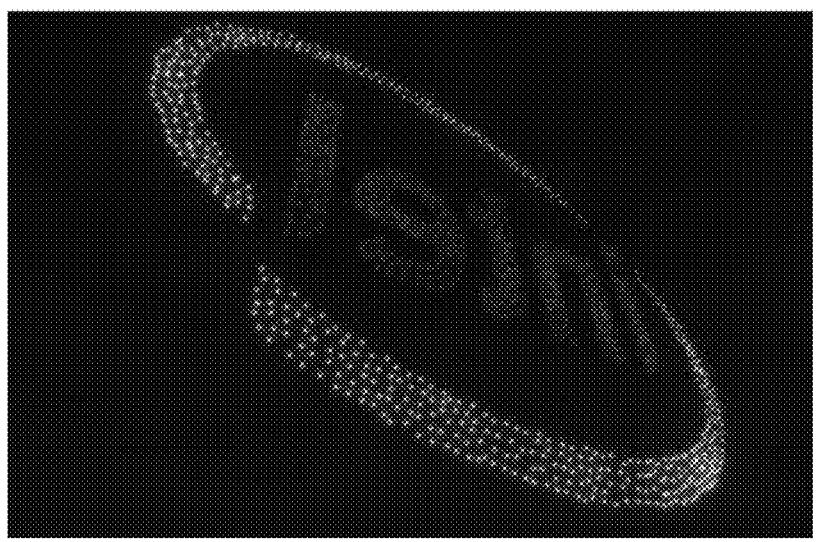
FIG. 11 shows an external image of a light show from a second vantage.
Figure 12:
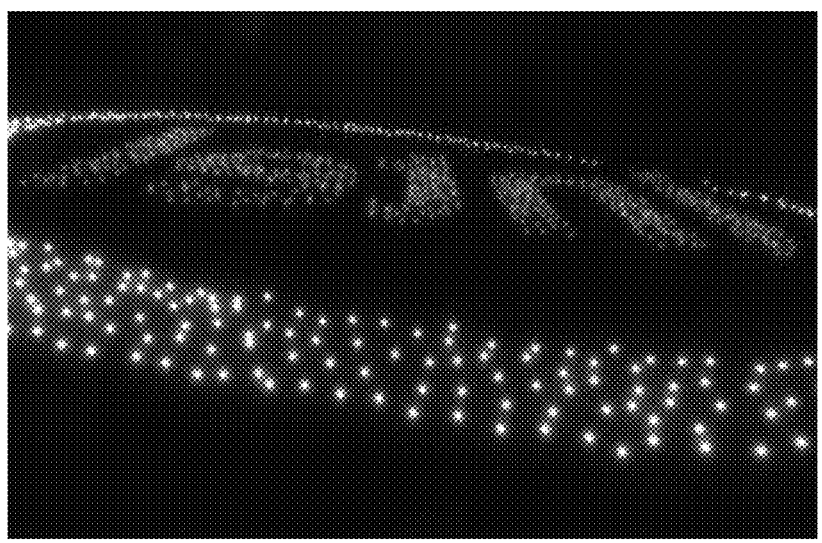
FIG. 12 shows an external image of a light show from a third vantage.

According to another aspect of the disclosure, a plurality of external image sensors or cameras 901 may receive image data of a light show from a variety of perspectives. Upon identifying the UAV locations within the variety of images at a variety of perspectives, a 3D reconstruction algorithm may be employed to create a point cloud or a point mesh or other 3D data organization scheme representing three-dimensional locations of the UAVs. The data points may then be compared to the ideal positions, thereby determining a distinction between an ideal position and an image position of one or more UAVs. Moreover, upon determining a discrepancy between one or more ideal positions and one or more image positions, the corresponding UAVs may be identified, and a corresponding navigation instruction may be sent to the UAVs to redirect them to the appropriate spot. FIG. 10 shows an external image of a light show from a first vantage. FIG. 11 shows an external image of a light show from a second vantage. FIG. 12 shows an external image of a light show from a third vantage. One or more processors may be configured to receive at least two external images as depicted in FIG. 10, FIG. 11, and FIG. 12, and calculate using a 3D reconstruction algorithm a 3D reconstruction of the UAV locations. The 3D reconstruction may be a point mesh, a point cloud, or any other means of 3D representation.

Figure 13:
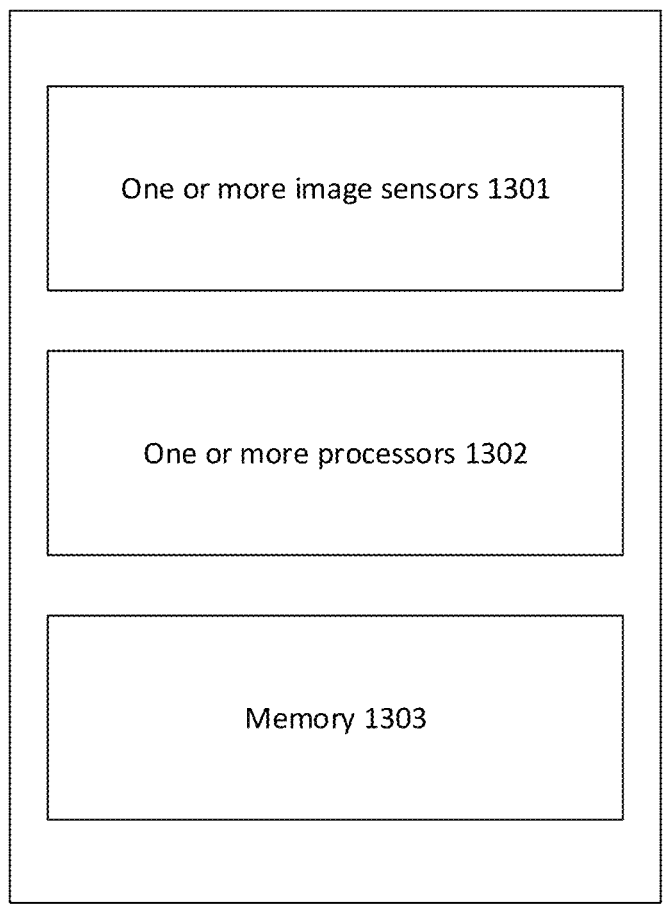
FIG. 13 show an unmanned aerial vehicle alignment system.

FIG. 13 is a system for managing unmanned aerial vehicle flight including one or more image sensors 1301, one or more processors 1302 and a memory 1303. The one or more image sensors 1301 are configured to obtain an image of a plurality of unmanned aerial vehicles and provide to one or more processors image data corresponding to the obtained image; the one or more processors 1302, are configured to detect from the image data image positions of the plurality of unmanned aerial vehicles; derive a target position based on a relationship between an image position and a target alignment; and determine an adjustment instruction to direct an unmanned aerial vehicle toward the target position. The memory 1303 is configured to store at least one of an unmanned aerial vehicle identity, an image position, a target alignment, a target position, and a programmed position.

Figure 14:
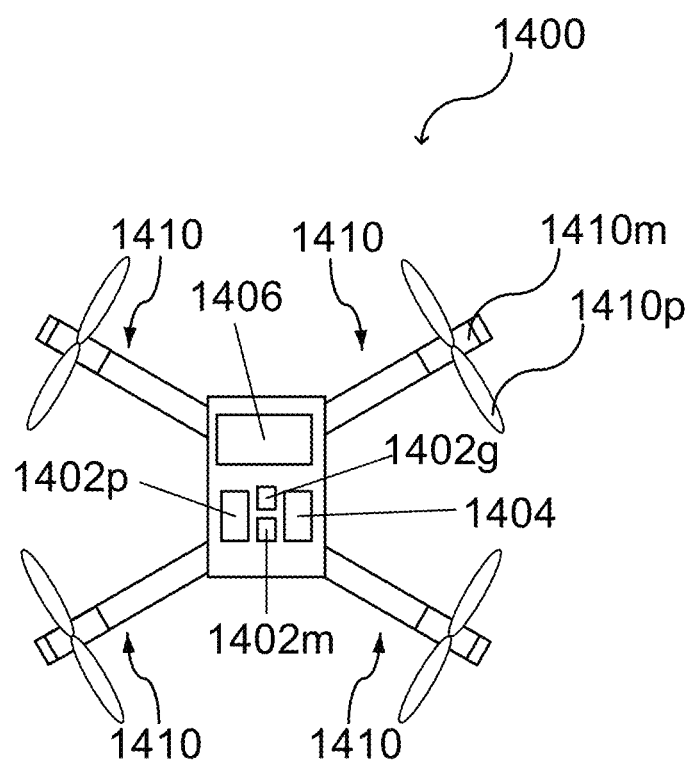
FIG. 14 shows an unmanned aerial vehicle including an unmanned aerial vehicle system.

FIG. 14 illustrates an unmanned aerial vehicle 1400 in a schematic view, according to various aspects. The unmanned aerial vehicle 1400 may include a plurality of (e.g., three or more than three, e.g., four, six, eight, etc.) vehicle drive arrangements 1410. Each of the vehicle drive arrangements 1410 may include at least one drive motor 1410*m* and at least one propeller 1410*p* coupled to the at least one drive motor 1410*m*. The one or more drive motors 1410*m* of the unmanned aerial vehicle 1400 may be electric drive motors.

Further, the unmanned aerial vehicle 1400 may include one or more processors 1402*p* configured to control flight or any other operation of the unmanned aerial vehicle 1400 including but not limited to navigation, image analysis, location calculation, and any method or action described herein. One or more of the processors 1402*p* may be part of a flight controller or may implement a flight controller. The one or more processors 1402*p* may be configured, for example, to provide a flight path based at least on an actual position of the unmanned aerial vehicle 1400 and a desired target position for the unmanned aerial vehicle 1400. In some aspects, the one or more processors 1402*p* may control the unmanned aerial vehicle 1400. In some aspects, the one or more processors 1402*p* may directly control the drive motors 1410*m* of the unmanned aerial vehicle 1400, so that in this case no additional motor controller may be used. Alternatively, the one or more processors 1402*p* may control the drive motors 1410*m* of the unmanned aerial vehicle 1400 via one or more additional motor controllers. The one or more processors 1402*p* may include or may implement any type of controller suitable for controlling the desired functions of the unmanned aerial vehicle 1400. The one or more processors 1402*p* may be implemented by any kind of one or more logic circuits.

According to various aspects, the unmanned aerial vehicle 1400 may include one or more memories 1402*m*. The one or more memories may be implemented by any kind of one or more electronic storing entities, e.g. a one or more volatile memories and/or one or more non-volatile memories. The one or more memories 1402*m* may be used, e.g., in interaction with the one or more processors 1402*p*, to build and/or store image data, ideal locations, locational calculations, or alignment instructions.

Further, the unmanned aerial vehicle 1400 may include one or more power supplies 1404. The one or more power supplies 1404 may include any suitable type of power supply, e.g., a directed current (DC) power supply. ADC power supply may include one or more batteries (e.g., one or more rechargeable batteries), etc.

According to various aspects, the unmanned aerial vehicle 1400 may include one or more sensors 1406. The one or more sensors 1406 may be configured to monitor a vicinity of the unmanned aerial vehicle 1400. The one or more sensors 1406 may be configured to detect obstacles in the vicinity of the unmanned aerial vehicle 1400. The one or more sensors 1406 may include, for example, one or more cameras (e.g., a depth camera, a stereo camera, a thermal imaging camera, etc.), one or more ultrasonic sensors, etc. The unmanned aerial vehicle 1400 may further include a position detection system 1402*g*. The position detection system 1402*g* may be based, for example, on global positioning system (GPS) or any other available positioning system. Therefore, the one or more processors 1402*p* may be further configured to modify the flight path of the unmanned aerial vehicle 1400 based on data obtained from the position detection system 1402*g*. The sensors 1406 may be mounted as depicted herein, or in any other configuration suitable for an implementation.

According to various aspects, the one or more processors 1402*p* may include at least one transceiver configured to provide an uplink transmission and/or downlink reception of radio signals including data, e.g. video or image data and/or commands. The at least one transceiver may include a radio frequency (RF) transmitter and/or a radio frequency (RF) receiver.

The one or more processors 1402*p* may further include an inertial measurement unit (IMU) and/or a compass unit. The inertial measurement unit may allow, for example, a calibration of the unmanned aerial vehicle 1400 regarding a predefined plane in a coordinate system, e.g., to determine the roll and pitch angle of the unmanned aerial vehicle 1400 with respect to the gravity vector (e.g. from planet earth). Thus, an orientation of the unmanned aerial vehicle 1400 in a coordinate system may be determined. The orientation of the unmanned aerial vehicle 1400 may be calibrated using the inertial measurement unit before the unmanned aerial vehicle 1400 is operated in flight modus. However, any other suitable function for navigation of the unmanned aerial vehicle 1400, e.g., for determining a position, a flight velocity, a flight direction, etc., may be implemented in the one or more processors 1402*p* and/or in additional components coupled to the one or more processors 1402*p*.

Figure 15:
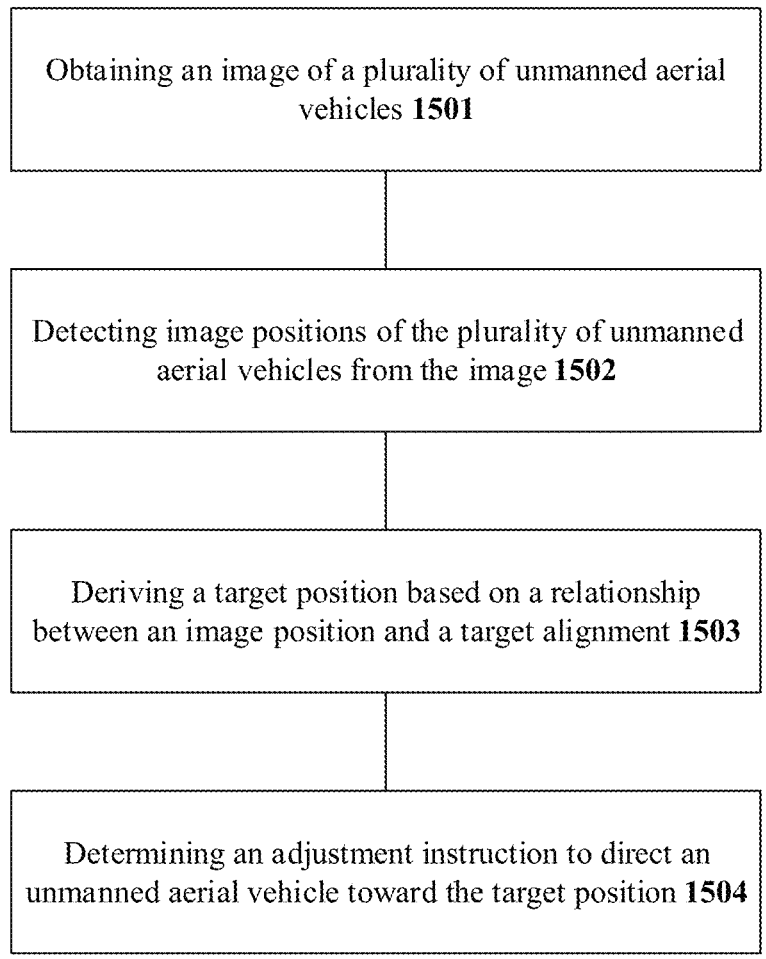
FIG. 15 shows a method of aligning an unmanned aerial vehicle.

FIG. 15 shows a method of unmanned aerial vehicle alignment including obtaining an image of a plurality of unmanned aerial vehicles 1501; detecting image positions of the plurality of unmanned aerial vehicles from the image 1502; deriving a target position based on a relationship between an image position and a target alignment 1503; and determining an adjustment instruction to direct an unmanned aerial vehicle toward the target position 1504.

To the extent that 1D alignment methods are discussed, any focus on 1D methods is for simplification of enablement of the principles and methods disclosed herein, and not intended to be a limitation to 1D alignment correction. Rather, the principles and method disclosed herein may also apply to 2D and/or 3D UAV configurations. With respect to 3D UAV configurations, and because the light show is a preprogrammed event, the intended location of each UAV is known. As such, the relative distances and positional relationships between the scout UAV and one or more additional UAVs may be determined. This information can be used, for example, to create a 3D map comprising relational information between the UAVs, such as relative distances, relative angles, and/or relative positions. This calculated information is then compared with information obtained from the images taken from the one or more image sensors. Whereas the 1D method can be used to derive an adjustment instruction with respect to a single axis, such as an axis perpendicular to a 2D UAV alignment as viewed from a side, 2D and 3D distance and alignment information derived from the light show program can be compared with depth and positional information to determine an alignment instruction. Such depth and positional information may be information derived from a depth-camera; depth information derived from an overlapping images taken from two cameras; depth information derived from relative sizes of the UAV lights; and/or positional information derived from relative positions in the image data, comparison of light radii, comparison of light intensity, or any other method disclosed herein.

UAV light shows depend on a plurality of UAVs reaching specific preprogrammed positions to create the overall perception of a shape, graphic, or word. Even small inaccuracies in a UAV's position can distort the final image and reduce the light show's aesthetic appeal. Moreover, failure to achieve a preprogrammed position may result in a hazard, as the UAVs in a light show may be required to be in close proximity to one another, and a failure to reach a preprogrammed position may render a first UAV undesirably close to a second UAV.

Failure to achieve a programmed position can result from positioning drift. In a light show, UAVs may be equipped with positioning system capability, such as the ability to determine position using GPS. Although GPS may be accurate for many purposes, GPS is subject to positioning drift, which is generally an inaccuracy in derived position information. This inaccuracy can arise from a number of factors including, but not limited to, clock drift in one or more GPS satellites, interference from buildings or other objects, and cloud cover. Even where drift is minimized, it may not be possible to obtain GPS positioning information within a degree of accuracy required for a given light show implementation. Accordingly, other strategies are described herein to correct a malpositioned UAV.

The positioning convergence procedures described herein rely on images received by one or more image sensors. The image sensors may be part of a UAV, or may be a separate camera device, whether itself mounted to a UAV or positioned elsewhere. According to one aspect of the disclosure, one or more image sensors may be located external to a light show and placed such that they receive image data including images of at least two UAVs within the light show. According to another aspect of the disclosure, one or more image sensors may be mounted on a UAV within a light show.

Depending on the capabilities of the image sensor, any corresponding lenses, a distance from the light show, and a size of the light show, the image sensor may be configured to receive images including each UAV within a light show. According to another aspect of the disclosure, a plurality of image sensors may be located in a plurality of areas, each image sensor being configured to receive image data including each UAV within the light show. Such a configuration results in multiple vantage points of the UAV light show, and therefore multiple perspectives of the light show, which may then be used to derive a 3D map of the actual UAV locations.

According to another aspect of the disclosure, the one or more image sensors may be part of, or mounted on, a UAV which itself is part of a UAV light show. Where the UAV light show is a planar light show, the image data received of one or more additional UAVs within the light show will ideally resemble a line, wherein the image sensor and the remaining UAVs are coplanar. At least because of positioning drift, such a coplanar arrangement may be merely aspirational. Rather, one or more UAVs within the light show are likely not to be coplanar with the remaining UAVs and will therefore appear in the image data as lights extrinsic to the coplanar line.

Once image data of one or more additional UAVs are obtained, image data must be processed to identify the one or more UAVs depicted within the image data. Such image data are likely to contain a landscape or backdrop with a plurality of UAVs in one or more formations. It is necessary to distinguish the UAVs from the landscape or backdrop, so that the UAV image position can be determined. This can be achieved by searching the image data for a UAV light. In order to participate in a light show, the UAV must be equipped with a light of sufficient brightness to be seen by spectator from a distance. These lights will result in bright spots within the image data, which can be ascertained based on a light color and/or a light shape. The distinction between a landscape or backdrop and a UAV light may be enhanced by a light show at night, where a surrounding sky may be dark, or even approaching black, which may be in stark contrast to the brightness of a UAV light.

According to one aspect of the disclosure, a given light show form may require fewer than all UAVs to produce a light. In such a situation, one or more UAVs may generally remain with the light show group, and may even be assigned a precise location, but will be instructed to turn off its light show light. The light show preprogrammed data may contain at least UAV programmed positions and light illumination instructions. Where an image of UAVs is taken and assessed for UAV lights, the time information from the image can be coordinated with the programmed light show illumination data to determine the UAVs that were instructed to have their lights turned on at the time the image was taken. This may permit exclusion of one or more UAVs for UAV identification purposes and may thus simplify UAV identification from image data.

According to one aspect of the disclosure, the one or more processors may be configured to assess the image data for pixels within a predetermined range of RGB hues that are likely to correspond to the UAV light. Operating under the assumption that objects in nature are unlikely to produce the same hue associated with the UAV light, the presence of such a hue within the image data may identify a corresponding UAV light. Similarly, the one or more processors may be configured to assess the image data for a brightness above a predetermined threshold. Particularly at night, where it is anticipated that exterior light sources are limited, the presence of a light above a predetermined threshold may be an indicator of the UAV. According to one aspect of the disclosure, the one or more processors may be programmed to distinguish a hue or brightness of non-UAV objects from UAV lights, such as distinguishing based on hue or brightness one or more celestial bodies or one or more artificial lights other than UAV lights.

According to one aspect of the disclosure, the one or more processors determine image positions of the UAVs, wherein the image position is the location of the UAVs as depicted within the image data. The image positions may be further assessed to determine a relationship of one image position to another. Upon receiving raw image data, the one or more processors identify the UAVs within the image data in the manner described supra, using hue, intensity, or otherwise. The center point and radius of the UAVs may be calculated to determine either an approximate actual distance or a relative distance of the UAVs with respect to the one or more image sensors.

The one or more processors may determine a target alignment of the identified UAVs based on the image data from the one or more sensors. According to one aspect of the disclosure, the target alignment may be a general gestalt or alignment, such as linear, planar, or 3D or cloud. Given an image position and a target alignment, a target position may be determined. According to one aspect of the disclosure, and specifically where the target alignment is linear or planar, the target position may be information obtained from a 1D average view. In some applications, a light show may include one or more images formed by UAVs that are ideally in the same plane. Such images are constructively 2D, including ideal destinations that can be plotted on a x-axis and y-axis, but without depth according to a z-axis. Due at least to positioning drift, it is anticipated the one or more UAVs in such a configuration will fail to achieve their ideal, programmed location. Such UAVs may be misplaced within the indented plane, whereby a z-axis location is coplanar with the remaining UAVs, but whereby the x-axis y-axis location does not correspond with an ideal location. In other circumstances, one or more misplaced UAVs may have failed to reach the correct point along a z-axis and are thus not coplanar with the remaining UAVs. Under this circumstance, a target alignment using a 1D average may permit determination of one or more target positions, and corresponding adjustment instructions that correct or substantially correct the misplaced UAVs.

Using this process, a UAV may be selected as a scout UAV, which is a UAV chosen to receive image data of an image including a plurality of UAVs. Where the scout UAV is coplanar or substantially coplanar with the other UAVs in the light show, some camera perspectives are unlikely to show any UAVs, while other perspectives are likely to show a side-view of the UAV plane. These views will ideally appear either as a solid line, or as a series of dots in a linear formation. To the extent that one or more UAVs are misplaced along the z-axis, the corresponding lights from these UAVs will not appear along the line or as points along the linear formation, but rather as points adjacent to the line. According to one aspect of the disclosure, a 1D average of the identified UAVs can be calculated to better determine a target position and adjustment instruction for the misplaced UAVs. The 1D average may be an average along an axis that is perpendicular to the ideal plane. That is, if from the vantage point of a scout UAV, the image data appears to show a plurality of UAVs aligned in a vertical line (essentially along a y-axis), the 1D average would be an average of points along an x-axis. The 1D average may be understood as an average of a plurality of image positions. By using the 1D average as a baseline, a target position and adjustment instruction can be determined for one or more misaligned UAVs to cause the misaligned UAVs to converge upon the 1D average.

Where one or more misaligned UAVs are corrected with a 1D average and adjustment instruction to result in converging upon the average value, as described above, the misaligned UAVs will ideally converge into, or near, the ideal plane. This results in a correction, or at least an improvement, of location along one axis. It is possible that one or more UAVs become misplaced with respect to a plurality of axes. The 1D method may correct or improve alignment along a single axis, which may simplify a subsequent alignment along a second or third axis. Moreover, improvement along a single axis, even where misplacement occurs along a plurality of axes, may also result in significant light show improvement in increased viewer satisfaction.

An target position may be a smoothing position. A smoothing position is a position that is selected for its location between at least two points. A smoothing position may not necessarily correspond to an ideal or programmed position, but rather is selected because of its ability to harmonize with the actual positions of two or more UAVs. A smoothing position may be an equidistant point between two UAVs. A smoothing position may be a point corresponding with the locations of at least two UAVs. For example, where two UAVs are separated by distance x, a smoothing position may be chosen distance x from either or both of the UAVs. The smoothing position may be a regular interval that is repeated between at least three UAVs. A smoothing position may be coplanar to at least two other UAVs.

According to another aspect of the disclosure, the target alignment may be a plane, and an adjustment information may be selected to cause one or more UAVs to converge toward the plane. Because UAV light shows are often preprogrammed events, the ideal coordinates of each UAV may be known. Where one or more UAVs are programmed to reach a single plane, this plane can be the target alignment. The scout UAV may be preprogrammed with an ideal destination for each UAV, and thus the scout UAV may be aware that one or more UAVs should ideally reach a destination within a specific plane. Rather than performing a 1D average estimation, he may be possible to instruct one or more UAVs to converge upon the designated plane. This may be performed, for example, with an adjustment instruction to one or more misaligned UAVs to travel to the target position.

Furthermore, wherein one or more UAVs are ideally preprogrammed to be located within a single plane, the scout UAV may determine a direction between a misplaced UAV and the ideal plane. From this determination, the misplaced UAV may be instructed to travel in the direction of the plane, such that convergence within the plane can be approximated or achieved.

An adjustment instruction may be an instruction aimed toward one or more misplaced UAVs. The adjustment instruction may include at least of the following: an absolute location, an instruction to travel in a specific direction, an instruction to travel a specific distance, and an instruction to align with two or more UAVs. Where the adjustment instruction includes an instruction to align with two or more UAVs, the UAV receiving the adjustment instruction may receive image data from its one or more cameras to calculate in approximate line or access between the two or more UAVs, and travel to a point along that line or access.

An adjustment instruction may be tailored to one or more specific UAVs. To provide a UAV-specific instruction, it may be necessary to identify a UAV to receive a given adjustment instruction. UAVs may be identified using at least one of: (1) identification from preprogrammed ideal locations; (2) identification using a known UAV as a reference; and (3) identification using a UAV signal.

Identification from preprogrammed ideal locations is performed using stored ideal UAV locations for a light show. Because the ideal UAV locations are known, the actual UAV locations or image positions may be mapped to the ideal locations to determine the identities of one or more UAVs. Specifically, the ideal UAV locations include at least an absolute location and a corresponding UAV. When an image position corresponds, or closely corresponds, to a preprogrammed absolute location, the preprogrammed identity can be imputed to the identity of the UAV in the image position.

A UAV may be identified using a known UAV as a reference. In this case, where at least one UAV has been identified, one or more UAVs may be further identified based on a relationship with the previously identified UAV. This may be based at least on preprogrammed ideal location data. That is, the first identified UAV may be mapped to a preprogrammed location. Additional UAVs to be identified may be assessed for their physical relationship with the identified UAV, and this physical relationship may be assessed from the identified UAV's corresponding preprogrammed identification. For example, where an unidentified UAV is five meters directly in front of an identified UAV, the preprogrammed locations may be assessed to determine whether a UAV is planned to be approximately five meters in front of the corresponding identified UAV, and if so, the identity of the UAV may be ascertained.

According to another aspect of the disclosure, a UAV may be identified by using a UAV signal. The UAV signal may be a light signal, whether on a visible spectrum or an invisible spectrum. The light signal may be an infrared light signal. The light signal may identify a specific UAV through a light frequency or a light pattern. Where a light frequency is used for identification, the UAV may be programmed to project light at a given frequency that is unique to one or more UAVs. By receiving this light frequency through its one or more sensors, the scout drone can either specifically identify a corresponding UAV or can narrow the pool of possible UAVs which may project this particular frequency. Where the pool of UAVs for a particular frequency is limited, additional identification methods may be employed to ascertain the UAV's specific identity. The specific light frequency may be a light frequency on the visual spectrum and thus perceivable by a human being, or a light frequency such as within the non-visible spectrum, which would be invisible to a human being. Where a light pattern is used for identification, the UAV may be programmed to project light in a specific pattern or frequency of lengths, bursts, or flashes. The light pattern may be a strobe of a predetermined frequency, a dimming between frequencies, a preprogrammed alteration between light projections of different lengths, or any other configuration of light projections that can be ascribed to a singular UAV. The scout UAV may receive the light pattern through its one or more image sensors, identify the pattern, and determine either a specific UAV identity or a limited pool of potential UAV identities. Where a limited pool of potential UAV identities is determined, additional methods of identification may be used to further narrow or identify the specific UAV. The light pattern may be projected on the visible or invisible spectrum.

Where a UAV is detected, its light may be analyzed for both a center and a radius. Because the UAV light appears as a bright or within the sensor data, the orb can be analyzed for a center point, and a distance between the center point and an outer edge of the orb can be determined as the light radius. Where multiple lights are identified, a comparison of the radii indicates a potential distance, such that lights with a smaller radius are deemed to be farther away, and lights with a larger radius are deemed to be closer. By ordering the radii accordingly, and estimation of relative distances can be approximated. This estimation of relative distances can be mapped to preprogrammed locations to determine at least one of an identity of a UAV and a distance between an image position and a preprogrammed location.

Where at least two UAVs overlap within a visual path of the one or more image sensors, the lights from the at least two UAVs may be indistinguishable from one another and may appear as an ellipse or other non-circular shape. This may be determined, for example, by calculating a radius in a plurality of directions, and where the radius in at least two directions differs beyond a predetermined threshold, it may be determined that at least two UAVs are overlapping within the same image. Where this occurs, a calculation of absolute or relative distance, whether based on radius or light intensity, may yield inaccurate results. As such, it may be desirable to calculate a distance confidence. The distance confidence is a value that indicates a likelihood that an identified light within the image data corresponds to a single UAV. Where the distance confidence is low, the corresponding light point may be disregarded for purposes of distance calculation. A light intensity may be used as a measure of UAV distance. Assuming comparable lights and comparable projection brightness is, a scout UAV may perceive lights from nearby UAVs as being brighter than lights from far-away UAVs. Where a UAV light is detected, the light may be assessed for brightness. The brightness is of a plurality of UAV lights may be ordered from brightest to darkest, wherein the brightness is an indication of a distance of the UAV. That is, the UAVs with the brightest lights are closer, and the UAVs with the darkest lights are farther away. This information may be used alone or with at least one of the light radius and preprogrammed ideal locations to identify a specific UAV and/or a distance between a UAV's image position and ideal location.

A scout UAV may be equipped with one or more image sensors. The image sensors may be configured to provide a desirable range of perspective from the scout UAV, including, but not limited to, a 360° view. A 360° view may be achieved by locating at least six image sensors in fore, aft, starboard, port, up, and down directions. The information from these at least six image sensors may be assembled in a cube map. To achieve a 360° view, the UAV may be equipped with two 180° cameras affixed to opposite portions of the UAV, such as the top and bottom, or in the fore and aft directions. To achieve a 360° view, the UAV may be equipped with a single 360° camera.

According to one aspect of the disclosure, the cameras may be mono image cameras or stereo image cameras. Mono image cameras may be combined to provide depth, wherein at least two cameras receive overlapping image data, and the overlapping image data is processed to reveal a three-dimensional image. Stereo cameras capable of providing a three-dimensional image may be used as an alternative or in addition to mono image cameras. Where one or more cameras on a UAV are capable of a three-dimensional view, the three-dimensional depth information may be further used to ascertain at least one of an identity of a UAV, an image position, and a difference between a image position and a programmed location.

According to another aspect of the disclosure, UAV image data may be obtained through one or more cameras external to the light show. Such image data may be obtained from one or more UAVs external to the light show. Such image data may alternatively be obtained from one or more cameras mounted at a location external to the light show. The one or more external cameras may be assigned a vantage point based on perspective, field-of-view, focal length, or any other desirable factor. Where a camera external to the light show is used, the absolute location of the camera is known, and the received image data can be assessed for at least one of an image position, a target position, a target alignment, and an adjustment instruction.

Where a plurality of cameras are external to a light show, the data from the plurality of cameras may be synchronized and assessed with a 3D reconstruction algorithm to determine a three-dimensional location of the UAVs within the light show. The 3D reconstruction algorithm may create points within a point cloud or mesh from various perspectives. The resulting 3D reconstruction can be compared with preprogrammed ideal locations to determine at least one of a UAV identification, an image position, a target alignment, a target position, and an adjustment instruction.

Where one or more cameras external to a light show are used, at least one of the cameras may be equipped with one or more processors configured to perform at least one of identifying an image position based on the image data, identifying a target alignment, identifying a target position, and identifying an adjustment instruction. The one or more processors may be configured with preprogrammed data of an ideal location of one or more UAVs.

Where one or more cameras external to the light show are used, the one or more cameras may be cameras attached to one or more UAVs within the light show. That is, at least one UAV within the light show may be instructed to fly outside of the light show such that images may be taken from an external vantage point.

According to one aspect of the disclosure, and regardless of whether the one or more image sensors are on a UAV within a light show, external to the light show, or a combination of these arrangements, the one or more image sensors may, under certain circumstances, not be directly equipped with one or more processors configured to perform at least one of identifying an image position based on the image data, or identifying a target alignment, a target position, or an adjustment instruction. Rather, the one or more cameras may be connected with a transceiver, configured to transmit image data from the one or more cameras to be used by one or more processors. That is, the one or more processors may be separated from the one or more cameras, in a wireless link may be established between them.

According to one aspect of the disclosure, the one or more image sensors may be still cameras or video cameras. Where the image sensors are still cameras, the cameras may be configured to take still images at a predetermined frequency, or upon demand. The predetermined frequency may be a frequency based on a duration of time, or frequency based on a change in a light show formation. Where the image sensors are video cameras, the video cameras may be configured to take constant video or intermittent video, or periodic still images.

In the following, various examples are provided with reference to the aspects described above.

In Example 1, an unmanned aerial vehicle alignment system is disclosed comprising:
one or more image sensors, configured to
obtain an image of a plurality of unmanned aerial vehicles and
provide to one or more processors image data corresponding to the obtained image;
one or more processors, configured to
detect from the image data image positions of the plurality of unmanned aerial vehicles;
derive a target position based on a relationship between an image position and a target alignment; and
determine an adjustment instruction to direct an unmanned aerial vehicle toward the target position.

In Example 2, the unmanned aerial vehicle alignment system of Example 1 is disclosed, further comprising a memory, configured to store at least one of an unmanned aerial vehicle identity, an image position, a target alignment, a target position, and a programmed position.

In Example 3, the unmanned aerial vehicle alignment system of Example 1 or 2 is disclosed, wherein the image is a two-dimensional image.

In Example 4, the unmanned aerial vehicle alignment system of Example 1 or 2 is disclosed, wherein the image is a three-dimensional image.

In Example 5, the unmanned aerial vehicle alignment system of any one of Examples 1 to 4 is disclosed, wherein the image comprises image data from a plurality of image sensors.

In Example 6, the unmanned aerial vehicle alignment system of any one of Examples 1 to 5 is disclosed, wherein the one or more processors are further configured to determine the image position by identifying a region within the image data with a brightness corresponding to an unmanned aerial vehicle light.

In Example 7, the unmanned aerial vehicle alignment system of any one of Examples 1 to 5 is disclosed, wherein the one or more processors are further configured to calculate the image position by identifying a region within the image data with a hue corresponding to an unmanned aerial vehicle light.

In Example 8, the unmanned aerial vehicle alignment system of any one of Examples 1 to 7 is disclosed, wherein the one or more processors are further configured to determine an absolute location of an unmanned aerial vehicle based on the image position and an absolute location of the one or more image sensors.

In Example 9, the unmanned aerial vehicle alignment system of any one of Examples 1 to 8 is disclosed, wherein the one or more processors are further configured to determine the target alignment based on a plurality of image positions.

In Example 10, the unmanned aerial vehicle alignment system of any one of Examples 1 to 8 is disclosed, wherein the one or more processors are further configured to determine the target alignment based on a plurality of programmed positions.

In Example 11, the unmanned aerial vehicle alignment system of any one of Examples 1 to 8 is disclosed, wherein the one or more processors are further configured to determine the target alignment based on a vantage point of the one or more image sensors.

In Example 12, the unmanned aerial vehicle alignment system of any one of Examples 9 to 12 is disclosed, wherein target alignment is a line.

In Example 13, the unmanned aerial vehicle alignment system of any one of Examples 9 to 12 is disclosed, wherein target alignment is a plane.

In Example 14, the unmanned aerial vehicle alignment system of any one of Examples 9 to 12 is disclosed, wherein target alignment is a three dimensional space.

In Example 15, the unmanned aerial vehicle alignment system of any one of Examples 1 to 14 is disclosed, wherein the target position is a position along the target alignment.

In Example 16, the unmanned aerial vehicle alignment system of any one of Examples 1 to 14 is disclosed, wherein the target position is a closest position to the image position along the target alignment.

In Example 17, the unmanned aerial vehicle alignment system of any one of Examples 1 to 14 is disclosed, wherein the target position is a smoothing position.

In Example 18, the unmanned aerial vehicle alignment system of Example 17 is disclosed, wherein the smoothing position is a location equidistant between at least two unmanned aerial vehicles.

In Example 19, the unmanned aerial vehicle alignment system of Example 17 is disclosed, wherein the smoothing position is a location that is co-planer to at least two unmanned aerial vehicles.

In Example 20, the unmanned aerial vehicle alignment system of Example 17 is disclosed, wherein the smoothing position is a predetermined distance from an unmanned aerial vehicle.

In Example 21, the unmanned aerial vehicle alignment system of Example 17 is disclosed, wherein the smoothing position is a regular interval from an unmanned aerial vehicle is disclosed, wherein the regular interval is a repeated distance between at least three UAVs.

In Example 22, the unmanned aerial vehicle alignment system of any one of Examples 1 to 21 is disclosed, wherein the adjustment instruction is an instruction to cause an unmanned aerial vehicle to converge to the target alignment.

In Example 23, the unmanned aerial vehicle alignment system of any one of Examples 1 to 21 is disclosed, wherein the adjustment instruction is a command comprising at least one of a direction and a distance.

In Example 24, the unmanned aerial vehicle alignment system of any one of Examples 1 to 23 is disclosed, wherein the one or more processors are further configured to locate an unmanned aerial vehicle light within the image data.

In Example 25, the unmanned aerial vehicle alignment system of Example 24 is disclosed, wherein the one or more processors are further configured to determine a center and a radius of the located light.

In Example 26, the unmanned aerial vehicle alignment system of Example 25 is disclosed, wherein the one or more processors are further configured to determine a relative locational relationship of a plurality of unmanned aerial vehicles by comparing the radii of a plurality of located lights.

In Example 27, the unmanned aerial vehicle alignment system of Example 26 is disclosed, wherein the one or more processors are further configured to order the plurality of located lights by length of radius.

In Example 28, the unmanned aerial vehicle alignment system of any one of Examples 25 to 27 is disclosed, wherein the one or more processors are further configured to determine a relative locational relationship of a plurality of unmanned aerial vehicles by comparing an intensity of a plurality of located lights.

In Example 29, the unmanned aerial vehicle alignment system of Example 28 is disclosed, wherein the one or more processors are further configured to order the plurality of located lights by light intensity.

In Example 30, the unmanned aerial vehicle alignment system of any one of Examples 1 to 29 is disclosed, wherein the one or more processors are further configured to identify an unmanned aerial vehicle by an emitted light signal.

In Example 31, the unmanned aerial vehicle alignment system of Example 30 is disclosed, wherein the emitted light signal is a light color.

In Example 32, the unmanned aerial vehicle alignment system of Example 30 is disclosed, wherein the emitted light signal is a light intensity.

In Example 33, the unmanned aerial vehicle alignment system of Example 30 is disclosed, wherein the emitted light signal is a predetermined pattern.

In Example 34, the unmanned aerial vehicle alignment system of any one of Examples 30 through 33 is disclosed, wherein the emitted light signal is transmitted within a light spectrum not visible to human beings.

In Example 35, the unmanned aerial vehicle alignment system of any one of Examples 1 to 34 is disclosed, wherein the one or more processors are further configured to identify an unmanned aerial vehicle by coordinating the image position with a programmed ideal position.

In Example 36, the unmanned aerial vehicle alignment system of any one of Examples 1 to 35 is disclosed, wherein the one or more image sensors are further configured to receive 360 degrees of image data.

In Example 37, the unmanned aerial vehicle alignment system of any one of Examples 1 to 36 is disclosed, wherein the one or more image sensors are depth-sensing cameras.

In Example 38, the unmanned aerial vehicle alignment system of any one of Examples 1 to 37 is disclosed, wherein the one or more processors are further configured to calculate a depth information from at least two two-dimensional images received from the one or more image sensors.

In Example 39, the unmanned aerial vehicle alignment system of any one of Examples 1 to 38 is disclosed, wherein the one or more image sensors are located on an unmanned aerial vehicle in a light show.

In Example 40, the unmanned aerial vehicle alignment system of any one of Examples 1 to 38 is disclosed, wherein the one or more image sensors are located on an unmanned aerial vehicle external to a light show.

In Example 41, the unmanned aerial vehicle alignment system of any one of Examples 1 to 40 is disclosed, wherein the one or more image sensors are distributed between at least a first location and a second location.

In Example 42, the unmanned aerial vehicle alignment system of Example 41 is disclosed, further comprising the one or more processors are further configured to derive a depth information from the image data from the at least first location and second location.

In Example 43, the unmanned aerial vehicle alignment system of any one of Examples 1 to 42 is disclosed, wherein the target alignment is a point mesh.

In Example 44, the unmanned aerial vehicle alignment system of any one of Examples 1 to 42 is disclosed, wherein the target alignment is a point cloud.

In Example 45, the unmanned aerial vehicle alignment system of any one of Examples 1 to 44 is disclosed, wherein the one or more processors are further configured to derive three-dimensional image data from a plurality of images using a three-dimensional point construction algorithm, and to determine the target alignment based on the three-dimensional image data.

In Example 46, the unmanned aerial vehicle alignment system of any one of Examples 1 to 45 is disclosed, further comprising a transceiver, configured to transmit an alignment instruction to an unmanned aerial vehicle.

In Example 47, a method of unmanned aerial vehicle alignment is disclosed comprising:
obtaining an image of a plurality of unmanned aerial vehicles;
detecting image positions of the plurality of unmanned aerial vehicles from the image;
deriving a target position based on a relationship between an image position and a target alignment; and
determining an adjustment instruction to direct an unmanned aerial vehicle toward the target position.

In Example 48, the method of unmanned aerial vehicle alignment of Example 1 is disclosed, further comprising storing at least one of an unmanned aerial vehicle identity, an image position, a target alignment, a target position, and a programmed position in a memory.

In Example 49, the method of unmanned aerial vehicle alignment of Example 1 or 2 is disclosed, wherein the image is a two-dimensional image.

In Example 50, the method of unmanned aerial vehicle alignment of Example 1 or 2 is disclosed, wherein the image is a three-dimensional image.

In Example 51, the method of unmanned aerial vehicle alignment of any one of Examples 1 to 4 is disclosed, wherein the image comprises image data from a plurality of image sensors.

In Example 52, the method of unmanned aerial vehicle alignment of any one of Examples 1 to 5 is disclosed, further comprising determining the image position by identifying a region within the image with a brightness corresponding to an unmanned aerial vehicle light.

In Example 53, the method of unmanned aerial vehicle alignment of any one of Examples 1 to 5 is disclosed, further comprising calculating the image position by identifying a region within the image with a hue corresponding to an unmanned aerial vehicle light.

In Example 54, the method of unmanned aerial vehicle alignment of any one of Examples 1 to 7 is disclosed, further comprising determining an absolute location of an unmanned aerial vehicle based on the image position and an absolute location of one or more image sensors.

In Example 55, the method of unmanned aerial vehicle alignment of any one of Examples 1 to 8 is disclosed, further comprising determining the target alignment based on a plurality of image positions.

In Example 56, the method of unmanned aerial vehicle alignment of any one of Examples 1 to 8 is disclosed, further comprising determining the target alignment based on a plurality of programmed positions.

In Example 57, the method of unmanned aerial vehicle alignment of any one of Examples 1 to 8 is disclosed, further comprising determining the target alignment based on a vantage point of the one or more image sensors.

In Example 58, the method of unmanned aerial vehicle alignment of any one of Examples 9 to 12 is disclosed, wherein target alignment is a line.

In Example 59, the method of unmanned aerial vehicle alignment of any one of Examples 9 to 12 is disclosed, wherein target alignment is a plane.

In Example 60, the method of unmanned aerial vehicle alignment of any one of Examples 9 to 12 is disclosed, wherein target alignment is a three dimensional space.

In Example 61, the method of unmanned aerial vehicle alignment of any one of Examples 1 to 14 is disclosed, wherein the target position is a position along the target alignment.

In Example 62, the method of unmanned aerial vehicle alignment of any one of Examples 1 to 14 is disclosed, wherein the target position is a closest position to the image position along the target alignment.

In Example 63, the method of unmanned aerial vehicle alignment of any one of Examples 1 to 14 is disclosed, wherein the target position is a smoothing position.

In Example 64, the method of unmanned aerial vehicle alignment of Example 17 is disclosed, wherein the smoothing position is a location equidistant between at least two unmanned aerial vehicles.

In Example 65, the method of unmanned aerial vehicle alignment of Example 17 is disclosed, wherein the smoothing position is a location that is co-planer to at least two unmanned aerial vehicles.

In Example 66, the method of unmanned aerial vehicle alignment of Example 17 is disclosed, wherein the smoothing position is a predetermined distance from an unmanned aerial vehicle.

In Example 67, the method of unmanned aerial vehicle alignment of Example 17 is disclosed, wherein the smoothing position is a regular interval from an unmanned aerial vehicle is disclosed, wherein the regular interval is a repeated distance between at least three UAVs.

In Example 68, the method of unmanned aerial vehicle alignment of any one of Examples 1 to 21 is disclosed, wherein the adjustment instruction is an instruction to cause an unmanned aerial vehicle to converge to the target alignment.

In Example 69, the method of unmanned aerial vehicle alignment of any one of Examples 1 to 21 is disclosed, wherein the adjustment instruction is a command comprising at least one of a direction and a distance.

In Example 70, the method of unmanned aerial vehicle alignment of any one of Examples 1 to 23 is disclosed, further comprising locating an unmanned aerial vehicle light within the image.

In Example 71, the method of unmanned aerial vehicle alignment of Example 24 is disclosed, further comprising determining a center and a radius of the located light.

In Example 72, the method of unmanned aerial vehicle alignment of Example 25 is disclosed, further comprising determining a relative locational relationship of a plurality of unmanned aerial vehicles by comparing the radii of a plurality of located lights.

In Example 73, the method of unmanned aerial vehicle alignment of Example 26 is disclosed, further comprising ordering the plurality of located lights by length of radius.

In Example 74, the method of unmanned aerial vehicle alignment of any one of Examples 25 to 27 is disclosed, further comprising determining a relative locational relationship of a plurality of unmanned aerial vehicles by comparing an intensity of a plurality of located lights.

In Example 75, the method of unmanned aerial vehicle alignment of Example 28 is disclosed, further comprising ordering the plurality of located lights by light intensity.

In Example 76, the method of unmanned aerial vehicle alignment of any one of Examples 1 to 29 is disclosed, further comprising identifying an unmanned aerial vehicle by an emitted light signal.

In Example 77, the method of unmanned aerial vehicle alignment of Example 30 is disclosed, wherein the emitted light signal is a light color.

In Example 78, the method of unmanned aerial vehicle alignment of Example 30 is disclosed, wherein the emitted light signal is a light intensity.

In Example 79, the method of unmanned aerial vehicle alignment of Example 30 is disclosed, wherein the emitted light signal is a predetermined pattern.

In Example 80, the method of unmanned aerial vehicle alignment of any one of Examples 30 through 33 is disclosed, wherein the emitted light signal is transmitted within a light spectrum not visible to human beings.

In Example 81, the method of unmanned aerial vehicle alignment of any one of Examples 1 to 34 is disclosed, further comprising identifying an unmanned aerial vehicle by coordinating the image position with a programmed ideal position.

In Example 82, the method of unmanned aerial vehicle alignment of any one of Examples 1 to 35 is disclosed, wherein the one or more image sensors receive 360 degrees of image data.

In Example 83, the method of unmanned aerial vehicle alignment of any one of Examples 1 to 36 is disclosed, wherein the one or more image sensors are depth-sensing cameras.

In Example 84, the method of unmanned aerial vehicle alignment of any one of Examples 1 to 37 is disclosed, further comprising calculating a depth information from at least two two-dimensional images received from the one or more image sensors.

In Example 85, the method of unmanned aerial vehicle alignment of any one of Examples 1 to 38 is disclosed, wherein the one or more image sensors are located on an unmanned aerial vehicle in a light show.

In Example 86, the method of unmanned aerial vehicle alignment of any one of Examples 1 to 38 is disclosed, wherein the one or more image sensors are located on an unmanned aerial vehicle external to a light show.

In Example 87, the method of unmanned aerial vehicle alignment of any one of Examples 1 to 40 is disclosed, wherein the image is received from image sensors located in at least a first location and a second location.

In Example 88, the method of unmanned aerial vehicle alignment of Example 41 is disclosed, further comprising deriving a depth information from the image from the at least first location and second location.

In Example 89, the method of unmanned aerial vehicle alignment of any one of Examples 1 to 42 is disclosed, wherein the target alignment is a point mesh.

In Example 90, the method of unmanned aerial vehicle alignment of any one of Examples 1 to 42 is disclosed, wherein the target alignment is a point cloud.

In Example 91, the method of unmanned aerial vehicle alignment of any one of Examples 1 to 44 is disclosed, further comprising deriving three-dimensional image data from a plurality of images using a three-dimensional point construction algorithm, and to determine the target alignment based on the three-dimensional image data.

In Example 92, the method of unmanned aerial vehicle alignment of any one of Examples 1 to 45 is disclosed, further comprising a transceiver, configured to transmit an alignment instruction to an unmanned aerial vehicle.

In Example 93, a means for unmanned aerial vehicle alignment is disclosed comprising: one or more image sensing means, configured to
obtain an image of a plurality of unmanned aerial vehicles and
provide to one or more processing means image data corresponding to the obtained image;
one or more processing means, configured to
detect from the image data image positions of the plurality of unmanned aerial vehicles;
derive a target position based on a relationship between an image position and a target alignment; and
determine an adjustment instruction to direct an unmanned aerial vehicle toward the target position.

In Example 94, the means for unmanned aerial vehicle alignment of Example 93 is disclosed, further comprising a storage means, configured to store at least one of an unmanned aerial vehicle identity, an image position, a target alignment, a target position, and a programmed position.

In Example 95, the means for unmanned aerial vehicle alignment of Example 93 or 94 is disclosed, wherein the image is a two-dimensional image.

In Example 96, the means for unmanned aerial vehicle alignment of Example 93 or 94 is disclosed, wherein the image is a three-dimensional image.

In Example 97, the means for unmanned aerial vehicle alignment of any one of Examples 93 to 96 is disclosed, wherein the image comprises image data from a plurality of image sensing means.

In Example 98, the means for unmanned aerial vehicle alignment of any one of Examples 93 to 97 is disclosed, wherein the one or more processing means are further configured to determine the image position by identifying a region within the image data with a brightness corresponding to an unmanned aerial vehicle light.

In Example 99, the means for unmanned aerial vehicle alignment of any one of Examples 93 to 97 is disclosed, wherein the one or more processing means are further configured to calculate the image position by identifying a region within the image data with a hue corresponding to an unmanned aerial vehicle light.

In Example 100, the means for unmanned aerial vehicle alignment of any one of Examples 93 to 99 is disclosed, wherein the one or more processing means are further configured to determine an absolute location of an unmanned aerial vehicle based on the image position and an absolute location of the one or more image sensing means.

In Example 101, the means for unmanned aerial vehicle alignment of any one of Examples 93 to 100 is disclosed, wherein the one or more processing means are further configured to determine the target alignment based on a plurality of image positions.

In Example 102, the means for unmanned aerial vehicle alignment of any one of Examples 93 to 100 is disclosed, wherein the one or more processing means are further configured to determine the target alignment based on a plurality of programmed positions.

In Example 103, the means for unmanned aerial vehicle alignment of any one of Examples 93 to 100 is disclosed, wherein the one or more processing means are further configured to determine the target alignment based on a vantage point of the one or more image sensing means.

In Example 104, the means for unmanned aerial vehicle alignment of any one of Examples 101 to 103 is disclosed, wherein target alignment is a line.

In Example 105, the means for unmanned aerial vehicle alignment of any one of Examples 101 to 104 is disclosed, wherein target alignment is a plane.

In Example 106, the means for unmanned aerial vehicle alignment of any one of Examples 101 to 104 is disclosed, wherein target alignment is a three dimensional space.

In Example 107, the means for unmanned aerial vehicle alignment of any one of Examples 93 to 106 is disclosed, wherein the target position is a position along the target alignment.

In Example 108, the means for unmanned aerial vehicle alignment of any one of Examples 93 to 106 is disclosed, wherein the target position is a closest position to the image position along the target alignment.

In Example 109, the means for unmanned aerial vehicle alignment of any one of Examples 93 to 106 is disclosed, wherein the target position is a smoothing position.

In Example 110, the means for unmanned aerial vehicle alignment of Example 109 is disclosed, wherein the smoothing position is a location equidistant between at least two unmanned aerial vehicles.

In Example 111, the means for unmanned aerial vehicle alignment of Example 109 is disclosed, wherein the smoothing position is a location that is co-planer to at least two unmanned aerial vehicles.

In Example 112, the means for unmanned aerial vehicle alignment of Example 109 is disclosed, wherein the smoothing position is a predetermined distance from an unmanned aerial vehicle.

In Example 113, the means for unmanned aerial vehicle alignment of Example 109 is disclosed, wherein the smoothing position is a regular interval from an unmanned aerial vehicle is disclosed, wherein the regular interval is a repeated distance between at least three UAVs.

In Example 114, the means for unmanned aerial vehicle alignment of any one of Examples 93 to 113 is disclosed, wherein the adjustment instruction is an instruction to cause an unmanned aerial vehicle to converge to the target alignment.

In Example 115, the means for unmanned aerial vehicle alignment of any one of Examples 93 to 113 is disclosed, wherein the adjustment instruction is a command comprising at least one of a direction and a distance.

In Example 116, the means for unmanned aerial vehicle alignment of any one of Examples 93 to 115 is disclosed, further comprising the one or more processing means being configured to locate an unmanned aerial vehicle light within the image data.

In Example 117, the means for unmanned aerial vehicle alignment of Example 116 is disclosed, further comprising the one or more processing means being configured to determine a center and a radius of the located light.

In Example 118, the means for unmanned aerial vehicle alignment of Example 117 is disclosed, wherein the one or more processing means are configured to determine a relative locational relationship of a plurality of unmanned aerial vehicles by comparing the radii of a plurality of located lights.

In Example 119, the means for unmanned aerial vehicle alignment of Example 118 is disclosed, wherein the one or more processing means are configured to order the plurality of located lights by length of radius.

In Example 120, the means for unmanned aerial vehicle alignment of any one of Examples 117 to 119 is disclosed, wherein the one or more processing means are configured to determine a relative locational relationship of a plurality of unmanned aerial vehicles by comparing an intensity of a plurality of located lights.

In Example 121, the means for unmanned aerial vehicle alignment of Example 120 is disclosed, wherein the one or more processing means order the plurality of located lights by light intensity.

In Example 122, the means for unmanned aerial vehicle alignment of any one of Examples 93 to 121 is disclosed, wherein the one or more processing means are further configured to identify an unmanned aerial vehicle by an emitted light signal.

In Example 123, the means for unmanned aerial vehicle alignment of Example 122 is disclosed, wherein the emitted light signal is a light color.

In Example 124, the means for unmanned aerial vehicle alignment of Example 122 is disclosed, wherein the emitted light signal is a light intensity.

In Example 125, the means for unmanned aerial vehicle alignment of Example 122 is disclosed, wherein the emitted light signal is a predetermined pattern.

In Example 126, the means for unmanned aerial vehicle alignment of any one of Examples 122 through 125 is disclosed, wherein the emitted light signal is transmitted within a light spectrum not visible to human beings.

In Example 127, the means for unmanned aerial vehicle alignment of any one of Examples 93 to 126 is disclosed, wherein the one or more processing means are further configured to identify an unmanned aerial vehicle by coordinating the image position with a programmed ideal position.

In Example 128, the means for unmanned aerial vehicle alignment of any one of Examples 93 to 127 is disclosed, wherein the one or more image sensing means are configured to receive 360 degrees of image data.

In Example 129, the means for unmanned aerial vehicle alignment of any one of Examples 93 to 128 is disclosed, wherein the one or more image sensing means are depth-sensing cameras.

In Example 130, the means for unmanned aerial vehicle alignment of any one of Examples 93 to 129 is disclosed, wherein the one or more processing means are configured to calculate a depth information from at least two two-dimensional images received from the one or more image sensing means.

In Example 131, the means for unmanned aerial vehicle alignment of any one of Examples 93 to 130 is disclosed, wherein the one or more image sensing means are located on an unmanned aerial vehicle in a light show.

In Example 132, the means for unmanned aerial vehicle alignment of any one of Examples 93 to 130 is disclosed, wherein the one or more image sensing means are located on an unmanned aerial vehicle external to a light show.

In Example 133, the means for unmanned aerial vehicle alignment of any one of Examples 93 to 132 is disclosed, wherein the one or more image sensing means are distributed between at least a first location and a second location.

In Example 134, the means for unmanned aerial vehicle alignment of Example 133 is disclosed, further comprising the one or more processing means being configured to derive a depth information from the image data from the at least first location and second location.

In Example 135, the means for unmanned aerial vehicle alignment of any one of Examples 93 to 134 is disclosed, wherein the target alignment is a point mesh.

In Example 136, the means for unmanned aerial vehicle alignment of any one of Examples 93 to 134 is disclosed, wherein the target alignment is a point cloud.

In Example 137, the means for unmanned aerial vehicle alignment of any one of Examples 93 to 136 is disclosed, wherein the one or more processing means are further configured to derive three-dimensional image data from a plurality of images using a three-dimensional point construction algorithm, and to determine the target alignment based on the three-dimensional image data.

In Example 138, the means for unmanned aerial vehicle alignment of any one of Examples 93 to 137 is disclosed, further comprising a transceiver, configured to transmit an alignment instruction to an unmanned aerial vehicle.

In Example 139, a non-transient computer readable medium is disclosed containing program instructions for causing a computer to perform any of the methods of Examples 47 to 92.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. An unmanned aerial vehicle alignment system comprising:
   one or more image sensors, configured to
     obtain an image of a plurality of unmanned aerial vehicles and
     provide to one or more processors image data corresponding to the obtained image;
   one or more processors, configured to
     detect from the image data image positions of the plurality of unmanned aerial vehicles;
     locate a plurality of unmanned aerial vehicle lights within the image data, determine a center and a radius of each located light, and determine relative locational relationships of the plurality of unmanned aerial vehicles by comparing the radii of a plurality of located lights;

derive a target position of an unmanned aerial vehicle based on a relationship between an image position of the unmanned aerial vehicle and a target alignment; and determine an adjustment instruction to direct the unmanned aerial vehicle toward the target position; and one or more transceivers, configured to provide the adjustment instruction to the unmanned aerial vehicle to maneuver the unmanned aerial vehicle toward the target position.

2. The unmanned aerial vehicle alignment system of claim 1, further comprising a memory, configured to store at least one of an identity of the unmanned aerial vehicle, the image position, the target alignment, the target position, and a programmed position.

3. The unmanned aerial vehicle alignment system of claim 1, wherein the one or more processors are further configured to determine the image position at least by identifying a region within the image data with a brightness corresponding to an unmanned aerial vehicle light.

4. The unmanned aerial vehicle alignment system of claim 1, wherein the one or more processors are further configured to calculate the image position at least by identifying a region within the image data with a hue corresponding to an unmanned aerial vehicle light.

5. The unmanned aerial vehicle alignment system of claim 1, wherein the one or more processors are further configured to determine an absolute location of an unmanned aerial vehicle based on the image position and an absolute location of the one or more image sensors.

6. The unmanned aerial vehicle alignment system of claim 1, wherein the one or more processors are further configured to determine the target alignment based on a plurality of image positions or programmed positions; and wherein target alignment is a line, a plane; or a three dimensional space.

7. The unmanned aerial vehicle alignment system of claim 1, wherein the one or more processors are further configured to identify an unmanned aerial vehicle by an emitted light signal, wherein the emitted light signal is a light color, a light intensity, or a predetermined pattern.

8. The unmanned aerial vehicle alignment system of claim 1, wherein the one or more processors are further configured to determine an average position of the plurality of unmanned aerial vehicles relative to a first axis based on the image positions;

determine an average line that extends along a second axis from the average position determined relative to the first axis, wherein the first axis and the second axis are perpendicular to each other; and determine the target alignment based the average line.

9. The unmanned aerial vehicle alignment system of claim 8, wherein the image comprises a planar view of the plurality of unmanned aerial vehicles, wherein the planar view is based on a vantage point of the one or more sensors such that the image positions of the plurality of unmanned aerial vehicles are substantially aligned along the second axis.

10. The unmanned aerial vehicle alignment system of claim 8, wherein the adjustment instruction provides position correction only relative to the first axis.

11. The unmanned aerial vehicle alignment system of claim 8, wherein the average line corresponds to a linear convergence or a planar convergence of the plurality of unmanned aerial vehicles arranged in three dimensional space.

12. The unmanned aerial vehicle alignment system of claim 1, wherein the one or more processors are configured to determine a second radius of each located light in a different direction than the radius, and determine a likelihood that a respective each located light corresponds to a single UAV when the second radius and the radius differ beyond a predetermined threshold.

13. A method of unmanned aerial vehicle alignment comprising:

obtaining an image of a plurality of unmanned aerial vehicles;

detecting image positions of the plurality of unmanned aerial vehicles from the image;

identifying a plurality of unmanned aerial vehicle lights within the image, determining a center and a radius of the plurality of unmanned aerial vehicle lights, and determining relative locational relationships of the plurality of unmanned aerial vehicle lights by comparing the radii and intensities of the unmanned aerial vehicle lights;

deriving a target position of an unmanned aerial vehicle based on a relationship between an image position of the unmanned aerial vehicle and a target alignment;

determining an adjustment instruction to direct the unmanned aerial vehicle toward the target position; and providing the adjustment instruction to the unmanned aerial vehicle to maneuver the unmanned aerial vehicle toward the target position.

14. The method of unmanned aerial vehicle alignment of claim 13, further comprising calculating the image position by identifying a region within the image with a hue or brightness corresponding to an unmanned aerial vehicle light.

15. The method of unmanned aerial vehicle alignment of claim 13, further comprising determining the target alignment based on a plurality of image positions or programmed positions; and determining the target alignment based on a vantage point of the one or more image sensors; wherein target alignment is a line, a plane, or a three dimensional space.

16. The method of unmanned aerial vehicle alignment of claim 13, wherein the adjustment instruction is an instruction to cause an unmanned aerial vehicle to converge to the target alignment.

17. A means for unmanned aerial vehicle alignment comprising:

one or more image sensing means, configured to obtain an image of a plurality of unmanned aerial vehicles and provide to one or more processing means image data corresponding to the obtained image;

one or more processing means, configured to detect from the image data image positions of the plurality of unmanned aerial vehicles;

locating a plurality of unmanned aerial vehicle lights within the image data, determining a center and a radius of each located light, and determining relative locational relationships of the plurality of unmanned aerial vehicles by comparing the radii of a plurality of located lights;

derive a target position of an unmanned aerial vehicle based on a relationship between an image position of the unmanned aerial vehicle and a target alignment; and determine an adjustment instruction to direct the unmanned aerial vehicle toward the target position; and one or more transceiving means, configured to
provide the adjustment instruction to the unmanned aerial vehicle to maneuver the unmanned aerial vehicle toward the target position.

18. The means for unmanned aerial vehicle alignment of claim 17, wherein the target position is a smoothing position, and wherein the smoothing position is at least one of a location equidistant between at least two unmanned aerial vehicles; a location that is co-planer to at least two unmanned aerial vehicles; a predetermined distance from an unmanned aerial vehicle, or a regular interval from an unmanned aerial vehicle, wherein the regular interval is a repeated distance between at least three UAVs.

* * * * *